US 8,423,671 B2

(12) United States Patent
Kim

(10) Patent No.: US 8,423,671 B2
(45) Date of Patent: Apr. 16, 2013

(54) MIDDLEWARE DEVICE AND METHOD OF SUPPORTING COMPATIBILITY OF DEVICES IN HOME NETWORK

(75) Inventor: Do-heon Kim, Gangnam-gu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1048 days.

(21) Appl. No.: 11/652,606

(22) Filed: Jan. 12, 2007

(65) Prior Publication Data
US 2007/0162586 A1 Jul. 12, 2007

(30) Foreign Application Priority Data

Jan. 12, 2006 (KR) ........................ 10-2006-0003617

(51) Int. Cl.
*G06F 15/16* (2006.01)
*H04L 12/28* (2006.01)
(52) U.S. Cl.
USPC ........... 709/246; 709/218; 709/223; 709/227; 370/254; 370/401
(58) Field of Classification Search ................... 709/246
See application file for complete search history.

(56) References Cited

U.S. PATENT DOCUMENTS

| | | | | |
|---|---|---|---|---|
| 7,376,723 | B2* | 5/2008 | Cho et al. .................... | 709/223 |
| 7,467,384 | B2* | 12/2008 | Brubacher et al. ........... | 718/104 |
| 7,788,409 | B2* | 8/2010 | Doumuki et al. ............ | 709/246 |
| 7,821,955 | B2* | 10/2010 | Morikuni et al. ............ | 370/252 |
| 7,830,821 | B2* | 11/2010 | Lin et al. ...................... | 370/254 |
| 7,895,361 | B2* | 2/2011 | Nishio ......................... | 709/246 |
| 8,027,353 | B2* | 9/2011 | Damola et al. ............... | 370/401 |
| 8,055,802 | B2* | 11/2011 | Choi et al. ................... | 709/249 |
| 2002/0052966 | A1 | 5/2002 | Isomura et al. | |
| 2003/0177270 | A1* | 9/2003 | Noda et al. ................... | 709/246 |
| 2004/0015609 | A1* | 1/2004 | Brown et al. ................ | 709/246 |
| 2004/0210912 | A1* | 10/2004 | Jeronimo ..................... | 719/328 |
| 2005/0097503 | A1 | 5/2005 | Zintel et al. | |
| 2005/0160172 | A1* | 7/2005 | Eytchison .................... | 709/227 |
| 2005/0210155 | A1 | 9/2005 | Oeda et al. | |
| 2005/0220139 | A1* | 10/2005 | Aholainen ................... | 370/466 |
| 2006/0031459 | A1* | 2/2006 | Ahn et al. .................... | 709/224 |
| 2006/0072618 | A1* | 4/2006 | Moribe et al. ............... | 370/474 |
| 2006/0143295 | A1* | 6/2006 | Costa-Requena et al. .... | 709/227 |
| 2006/0153072 | A1* | 7/2006 | Bushmitch et al. .......... | 370/230 |

(Continued)

FOREIGN PATENT DOCUMENTS

| | | |
|---|---|---|
| CN | 1671120 A | 9/2005 |
| JP | 2004-38526 A | 2/2004 |
| KR | 10-2004-0073864 A | 8/2004 |

*Primary Examiner* — Backhean Tiv
(74) *Attorney, Agent, or Firm* — Sughrue Mion, PLLC

(57) ABSTRACT

A middleware device and a method of supporting compatibility of devices on a home network are provided, in which the compatibility of all kinds of devices based on UPnP and web service is supported by protocol conversion. The middleware device includes a discovery unit receiving discovery messages based on different protocols and converting each of the discovery messages to a message based on a protocol that can be processed by a device to which the messages are to be transmitted; a description unit creating a description file of a predetermined device requested from the UPnP and the web service and converting the created description file such that it can be processed by a device having requested the description file; and an information management unit managing service information and information on devices existing on the home network on the basis of the discovery message and the description file.

19 Claims, 25 Drawing Sheets

U.S. PATENT DOCUMENTS

| | | | |
|---|---|---|---|
| 2006/0195613 A1* | 8/2006 | Aizu et al. | 709/246 |
| 2006/0245403 A1* | 11/2006 | Kumar | 370/338 |
| 2007/0078987 A1* | 4/2007 | Walker et al. | 709/227 |
| 2007/0115996 A1* | 5/2007 | Shitano et al. | 370/392 |
| 2007/0162586 A1* | 7/2007 | Kim | 709/223 |
| 2008/0291930 A1* | 11/2008 | Damola et al. | 370/401 |
| 2009/0122722 A1* | 5/2009 | Lin et al. | 370/254 |
| 2009/0180398 A1* | 7/2009 | Lejeune | 370/254 |
| 2009/0190603 A1* | 7/2009 | Damola et al. | 370/401 |
| 2009/0303926 A1* | 12/2009 | Den Hartog et al. | 370/328 |
| 2010/0262467 A1* | 10/2010 | Barnhill, Jr. et al. | 705/10 |
| 2012/0072967 A1* | 3/2012 | Damola et al. | 725/148 |

\* cited by examiner

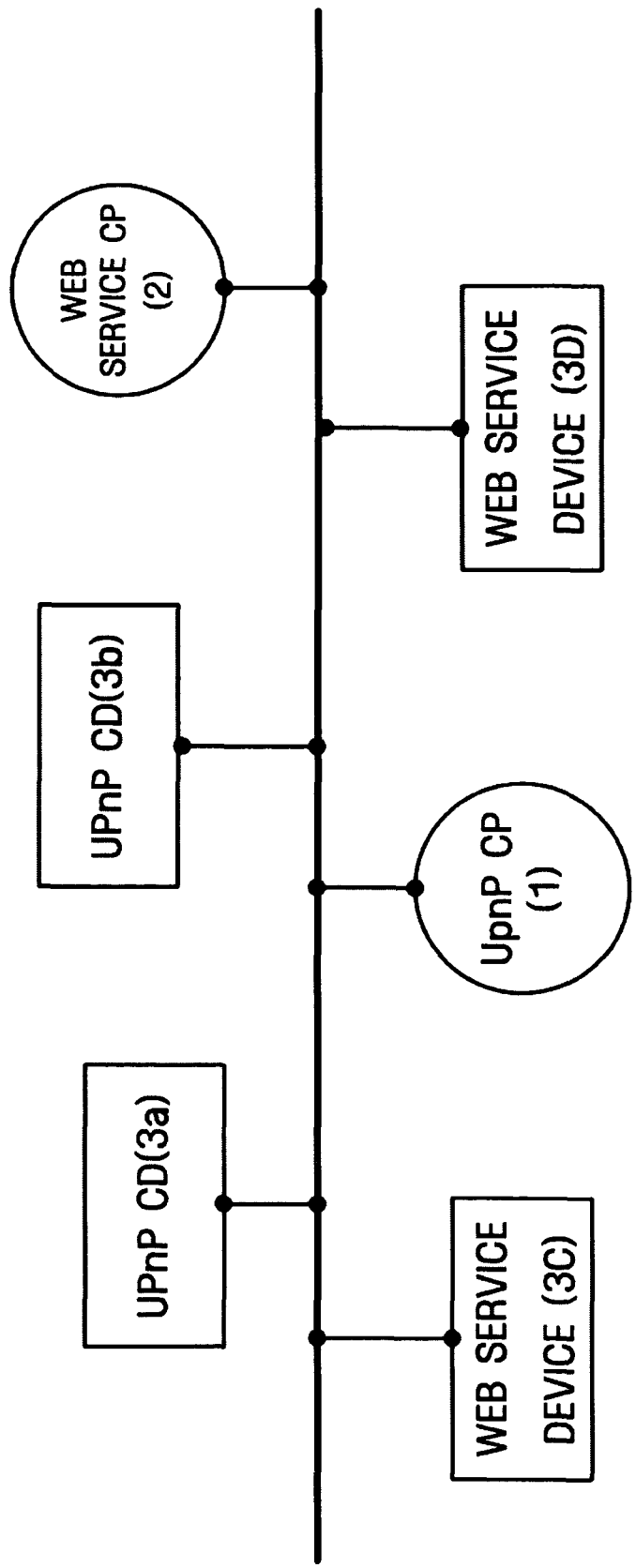

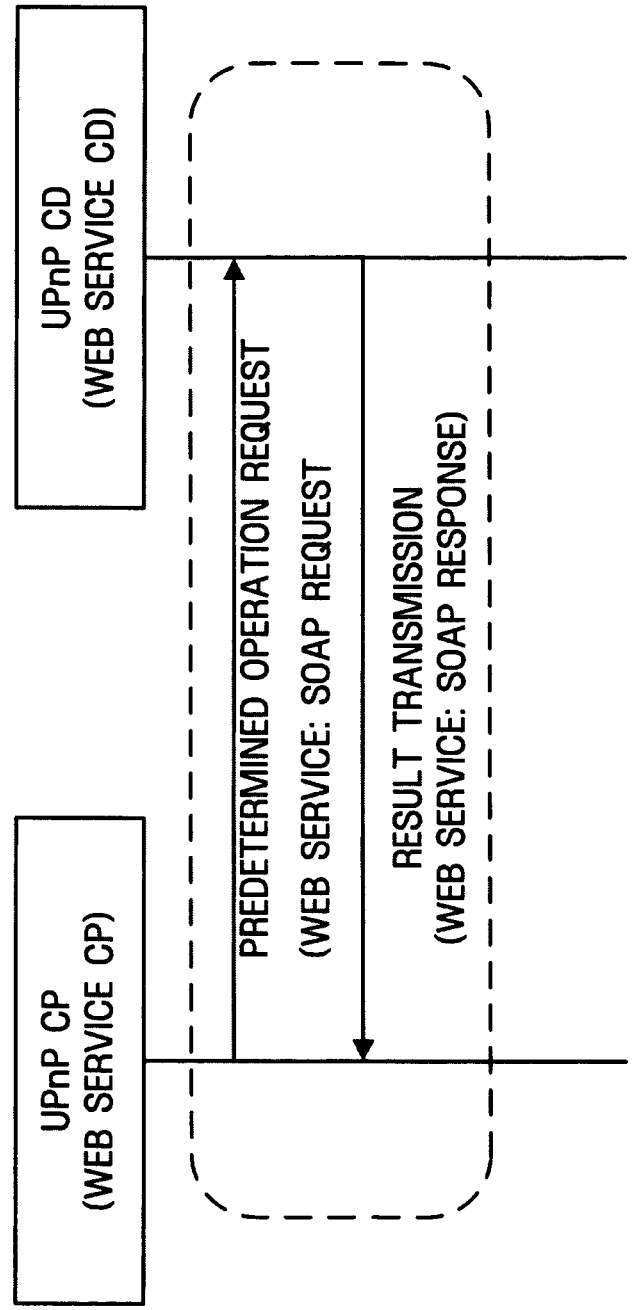

FIG. 10A

```
NOTIFY * HTTP/1.1
HOST: 239.255.255.250:1900
CACHE-CONTROL: max-age = seconds until advertisement expires
LOCATION: URL for UPnP description for root device       ─┐ (1)
NT: search target                                         │
NTS: ssdp:alive                                          ─┘ (2)
SERVER: OS/version UPnP/1.0 product/version
USN: advertisement UUID                                  ─── (3)
```

FIG. 10B

```
(01) <s:Envelope
(02)   xmlns:a='http://schemas.xmlsoap.org/ws/2003/03/addressing'
(03)   xmlns:d='http://schemas.xmlsoap.org/ws/2004/02/discovery'
(04)   xmlns:i='http://printer.example.org/2003/imaging'
(05)   xmlns:p='http://schemas.xmlsoap.org/ws/2002/12/policy'
(06)   xmlns:s='http://www.w3.org/2003/05/soap-envelope' >
(07) <s:Header>
(08)   <a:Action>
(09)     http://schemas.xmlsoap.org/ws/2004/02/discovery/Hello
(10)   </a:Action>
(11)   <a:MessageID>
(12)     uuid:0a6dc791-2be6-4991-9af1-454778a1917a
(13)   </a:MessageID>
(14)   <a:To>http://schemas.xmlsoap.org/ws/2004/02/discovery</a:To>
(15)   <d:AppSequence InstanceId='1077004800 MessageNumber='1' />
(16) </s:Header>
(17) <s:Body>
(18)   <d:Hello>
(19)     <a:EndpointReference>
(20)       <a:Address>
(21)         uuid:98190dc2-0890-4ef8-ac9a-5940995e6119
(22)       </a:Address>
(23)       <p:Policy>
(24)         <d:SoapHttpRequestReplyAddress>
(25)           http://prn-example/PRN42/b42-1668-a
(26)         </d:SoapHttpRequestReplyAddress>
(27)       </p:Policy>
(28)     </a:EndpointReference>
(29)     <d:Types>i:PrintBasic i:PrintAdvanced</d:Types>
(30)     <d:Scopes>
(31)       ldap:///ou=engineering,o=examplecom,c=us
(32)       ldap:///ou=floor1,ou=b42,ou=anytown,o=examplecom,c=us
(33)     </d:Scopes>
(34)     <d:MetadataVersion>75965</d:MetadataVersion>
(35)   </d:Hello>
(36) </s:Body>
(37) </s:Envelope>
```

FIG. 11A

```
POST path of control URL HTTP/1.1
HOST: host of control URL :port of control URL
CONTENT-LENGTH: bytes in body
CONTENT-TYPE: text/xml; charset="utf-8"
SOAPACTION: "urn:schemas-upnp-org:service:serviceType:v#actionName"

<?xml version ="1.0"?>
<s:Envelope
    xmlns:s="http://schemas.xmlsoap.org/soap/envelope/"
    s:encodingStyle="http://schemas.xmlsoap.org/soap/encoding/">
  <s:Body>
    <u:actionName xmlns:u="urn:schemas-upnp-org:service:serviceType:v">
      <argumentName>in arg value</argumentName>
      other in args and their values go here , if any
    </u:actionName>
  </s:Body>
</s:Envelope>
```

FIG. 11B

```
<soap:Envelope
    xmlns:img="http://printer.example.org/imaging"
    xmlns:soap="http://www.w3.org/2003/05/soap-envelope"
    xmlns:wsdp="http://schemas.xmlsoap.org/ws/2004/08/devprof"
    xmlns:wsa="http://schemas.xmlsoap.org/ws/2004/08/addressing" >
  <soap:Header>
    <wsa:Action>
      http://printer.example.org/imaging/PrintBasic/PrintJob
    </wsa:Action>
    <wsa:MessageID>
      uuid:90ef6038-92f9-45f7-847a-44c92ac832ef
    </wsa:MessageID>
    <wsa:ReplyTo>
      <wsa:Address>
        http://schemas.xmlsoap.org/ws/2004/08/addressing/role/anonymous
      </wsa:Address>
    </wsa:ReplyTo>
    <wsdp:ServiceId>
      http://printer.example.org/imaging/service/print
    </wsdp:ServiceId>
    <wsa:To>uuid:57205e8e-0ddf-463f-9f36-8ff944adbbc4</wsa:To>
  </soap:Header>
  <soap:Body>
    <img:PrintJob>
      <img:JobDescription>
        <img:Name>Example Job</img:Name>
        <img:OriginatingUserName>Smith</img:OriginatingUserName>
        <img:KOctets>40960</img:KOctets>
        <img:MediaSheets>3</img:MediaSheets>
      </img:JobDescription>
      <img:JobProcessing>
        <img:Copies>3</img:Copies>
        <img:Finishings>
          <img:Finishing>JogOffset</img:Finishing>
        </img:Finishings>
        <img:Priority>50</img:Priority>
      </img:JobProcessing>
      <img:DocumentProcessing>
        <img:MediaSizeName>iso_a4_210x297mm</img:MediaSizeName>
        <img:MediaType>cardstock</img:MediaType>
        <img:NumberUp>1</img:NumberUp>
        <img:OrientationRequested>Landscape</img:OrientationRequested>
        <img:PrintQuality>Draft</img:PrintQuality>
        <img:Sides>OneSided</img:Sides>
      </img:DocumentProcessing>
      <img:DocumentDescription>
        <img:Compression>None</img:Compression>
        <img:Format>application/vnd.pwg-xhtml-print+xml</img:Format>
        <img:Name>Example.xml</img:Name>
        <img:Uri>http://157.56.236.138/spool/xlevi5do/Example.xml</img:Uri>
      </img:DocumentDescription>
    </img:PrintJob>
  </soap:Body>
</soap:Envelope>
```

FIG. 12A

SUBSCRIBE *publisher path* HTTP/1.1
HOST: *publisher host:publisher port*
CALLBACK: <*delivery URL*>
NT: upnp:event
TIMEOUT: Second-*requested subscription duration*

FIG. 12B

```
<soap:Envelope
  xmlns:soap="http://www.w3.org/2003/05/soap-envelope"
  xmlns:wsdp="http://schemas.xmlsoap.org/ws/2004/08/devprof"
  xmlns:wsa="http://schemas.xmlsoap.org/ws/2004/08/addressing"
  xmlns:wse="http://schemas.xmlsoap.org/ws/2004/01/eventing" >
 <soap:Header>
  <wsa:Action>
    http://schemas.xmlsoap.org/ws/2004/01/eventing/Subscribe
  </wsa:Action>
  <wsa:MessageID>
    uuid:314bea3b-03af-47a1-8284-f495497f1e33
  </wsa:MessageID>
  <wsa:ReplyTo>
   <wsa:Address>
    http://schemas.xmlsoap.org/ws/2004/08/addressing/role/anonymous
   </wsa:Address>
  </wsa:ReplyTo>
  <wsa:To>uuid:57205e8e-0ddf-463f-9f36-8ff944adbbc4</wsa:To>
  <wsdp:ServiceId>
    http://printer.example.org/imaging/service/print
  </wsdp:ServiceId>
 </soap:Header>
 <soap:Body>
  <wse:Subscribe>
   <wse:NotifyTo>
    <wsa:Address>uuid:3726983d-02de-4d41-8207-d028ae92ce3d</wsa:Address>
   </wse:NotifyTo>
   <wse:Expires>PT10M</wse:Expires>
   <wse:Filter
     Dialect="http://schemas.xmlsoap.org/ws/2004/08/devprof/Action" >
    http://printer.example.org/imaging/PrintBasic/JobEndState
    http://printer.example.org/imaging/PrintBasic/PrinterState
   </wse:Filter>
  </wse:Subscribe>
 </soap:Body>
</soap:Envelope>
```

MIDDLEWARE DEVICE AND METHOD OF SUPPORTING COMPATIBILITY OF DEVICES IN HOME NETWORK

CROSS-REFERENCE TO RELATED APPLICATION

This application claims priority from Korean Patent Application No. 10-2006-0003617 filed on Jan. 12, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to a middleware device and a method of supporting compatibility of devices on a home network, and more particularly, to supporting compatibility of all kinds of devices based on Universal Plug-and-Play (UPnP) and web service by a middleware device capable of converting protocols of the UPnP and web service existing on a home network.

2. Description of the Related Art

Representative examples of protocols that are used in home networks include UPnP and web service.

UPnP technology is architecture that provides peer-to-peer connectivity among all kinds of intelligent products, wireless devices, and personal computers. UPnP has been designed to provide connectivity based on a standard, which is flexible and easily used in home, small offices, public places, or ad-hoc network or unmanaged network connected to the Internet. The UPnP technology provides distributed open network architecture that enables Transmission Control Protocol/Internet Protocol (TCP/IP) and web technologies to perform ceaseless proximity networking. The UPnP device architecture defines a communication protocol between a control point (CP) that performs control and a controlled device (CD) that is controlled by the CP. The CP corresponds to a client, and the CD corresponds to a service or a device that provides a service. Communication in a network based on UPnP is divided into discovery, description, control, and eventing operations. Hereinafter, the above operations will be described in detail with reference to FIG. 2.

The web service technology is a technology that enables an application developer to develop more powerful applications by using a service open on the web, and realizes distributed computing environments on the Internet. Important concepts related to a networking technology based on the web service include Simple Object Access Protocol (SOAP), Web Service Description Language (WSDL), and Universal Discovery Description and Integration (UDDI). The web service opens useful functions to web users through SOAP, which is a standard web protocol. The SOAP protocol defines an extensible Markup Language (XML) format for messages. The web service provides an XML document called WSDL in order to describe the interface necessary for a client application. The WSDL defines those included in a request message with respect to a web service and a method of describing a response message. The client application can find a required web service through the UDDI.

As described above, both the web service and UPnP technologies provide connectivity and interoperability among different services under the distributed computing environment. However, there is a problem in that protocols for distributed computing, such as UPnP or web service, are not interoperable with each other because description formats and details of the protocols thereof are different from each other.

FIG. 1 is a view illustrating the configuration of a home network in the related art.

As shown in FIG. 1, devices on the home network can be largely divided into two types from a logical point of view. One type is CDs (controlled devices) 3a, 3b, 3c, and 3d that provide inherent services thereof and are controlled by a user, and the other type is CPs (control points) 1 and 2 that provide a user with a function by which devices in a home can be controlled. Each of the UPnP and the web service configures an in-home network in the form of the CD and CP.

However, in the case when devices having middleware based on UPnP or web service exist together on a network, devices that support the UPnP and devices that support the web service cannot interoperate and communicate with each other.

Therefore, a service developer must consider whether a network is based on a UPnP technology or a web service technology in the development of applications, which is inconvenient.

FIGS. 2A to 2D are views illustrating a procedure of performing the discovery, description, control, and eventing operations on a home network in the related art.

FIG. 2A is a view illustrating the discovery operation in the UPnP and the web service. As shown in FIG. 2A, both the UPnP and web service devices use a dynamic multicast discovery protocol as a discovery protocol on a home network environment.

However, the UPnP uses an Simple Service Discovery Protocol (SSDP) based on HTTP header, while the web service uses a WS-Discovery protocol that is based on a web service. Here, both the SSDP and the WS-Discovery employ similar logic based on the dynamic multicast discovery protocol, but there is no compatibility therebetween.

The discovery operation is largely divided into two sub-operations. In a first sub-operation, a CP finds a CD that the CP desires to control on a home network (i.e., an advertise message transmission in the case of UPnP, and a hello message transmission in the case of web service). In a second sub-operation, the CP makes itself recognized by the CD as the CP enters the home network (i.e., a search message transmission in the case of UPnP, and a probe message transmission in the case of web service). Thus, the CP receives a unicast response message from the CD (i.e., a response message in the case of UPnP, and a probe match message in the case of web service).

Moreover, in the event of a user exiting from the home network without further operations, both the UPnP and web service devices multicast a "bye message" to in-home CPs.

FIG. 2B is a view illustrating the description operation in the UPnP and the web service. As shown in FIG. 2B, both the UPnP and web service use an XML format as description of devices and services to be provided.

However, the UPnP uses the device description template and service description template that are specified by the UPnP forum, while the web service device uses a WSDL, which is a standard related to service description of a web service. Here, the UPnP and the web service are based on the XML format and are similar to each other but there is no compatibility therebetween.

In the description operation, the CP acquires description information on device and service of the CD that the CP desires to control.

That is, both the UPnP and the web service read description information on a corresponding device or service on the basis of description URL information of a corresponding CD acquired in the discovery operation.

FIG. 2C is a view illustrating the control operation in the UPnP and the web service. As shown in FIG. 2C, both the UPnP and web service use SOAP as a control message protocol. However, the UPnP is based on SOAP version 1.1 while the web service device is based on SOAP version 1.2, which may cause a problem in interoperability.

In the control operation, a control command is transmitted between the CP and CD, and both the UPnP and the web service use a SOAP message protocol. The transmission of the control command is made in the form of a response message with respect to a request message.

FIG. 2D is a view illustrating the eventing operation in the UPnP and the web service. As shown in FIG. 2D, eventing logic of both the UPnP and the web service device are similar to each other, but the UPnP uses Generic Event Notification Architecture (GENA) based on the HTTP header, while the web service device uses a WS-Eventing protocol, which is a standard related to eventing of a web service. Accordingly, there is no compatibility between the UPnP and the web service.

In the eventing operation, the CP receives a corresponding event message from the CD. Therefore, in order that the CP receives the event message, the CP should be registered in the CD in a subscription operation.

Thereafter, when a state of the CD changes or a specific eventing situation occurs, the event message is transmitted to the registered CP. In addition, the CP can perform, for example, a time-out setting in the subscription operation and make a renewal request within the time out period. In addition, if transmission of event messages from the CD are not further required, the CP can make a cancellation request.

However, there is no compatibility between the UPnP and the web service device, and accordingly, when the UPnP and the web service device exist together on a home network, the UPnP CP cannot control the web service device and the web service CP cannot also control the UPnP CD. Further, even the compatibility between the UPnP CD and the web service device is not supported.

Korean Unexamined Patent Application Publication No. 2004-073864 ("Application downloading method of downloading and automatically installing application packs and dynamically creating menu and integrated home server system using the same") discloses a home server system in which a UPnP connection technology is realized through addressing, discovery, description, control, and presentation operations and which includes a communication manager module for web service communication between a home server middleware and a connection medium on an external network, a converter module that converts a UPnP-based message to a web-service-based message based on a web service connection standard, a description manager module that describes detailed service information on a corresponding product, and an application manager module. However, Korean Unexamined Patent Application Publication No. 2004-073864 does not disclose a technology for supporting compatibility of devices, such as the UPnP and the web service, which are not compatible with each other on a home network.

SUMMARY OF THE INVENTION

An object of the present invention is to support compatibility of all kinds of devices based on the UPnP and web service by a middleware device capable of converting protocols of the UPnP and web service existing on a home network.

Objects of the present invention are not limited to those mentioned above, and other objects of the present invention will be apparently understood by those skilled in the art through the following description.

According to an aspect of the present invention, a middleware device for supporting compatibility of devices on a home network is provided which includes a discovery unit which receives discovery messages based on different protocols utilized by different devices existing on the home network and converting each of the discovery messages which are received to a message based on a protocol that can be processed by a device to which each of the discovery messages is to be transmitted, wherein the different protocols include a Universal Plug-and-Play (UPnP) protocol and a web service protocol; a description unit which creates a description file of a predetermined device which is requested using a request message based on one of the different protocols and converts the description file which is created such that the description file can be processed by a device which requested the description file; and an information management unit which manages service information and information on devices existing on the home network based on the discovery message and the description file.

Further, according to another aspect of the present invention, a method of supporting compatibility of devices on a home network is provided which includes receiving discovery messages based on a plurality of different protocols utilized by different devices existing on the home network; determining, for each of the discovery messages, a protocol among the plurality of different protocols which the received discovery message is based on; and converting each of the discovery messages which are received to a message based on a protocol that can be processed by a device to which each of the discovery messages is to be transmitted, wherein the plurality of different protocols include a Universal Plug-and-Play (UPnP) protocol and a web service protocol.

Furthermore, according to still another aspect of the present invention, a method of supporting compatibility of devices on a home network is provided which includes receiving description messages which are based on a plurality of different protocols utilized by different devices existing on the home network; determining, for each of the description messages, a protocol among the plurality of different protocols which the received discovery message is based on; and converting each of the description messages which are received to a message based on a protocol that can be processed by a device to which each of the discovery messages is to be transmitted, wherein the plurality of different protocols include a Universal Plug-and-Play (UPnP) protocol and a web service protocol.

BRIEF DESCRIPTION OF THE DRAWINGS

The above and other aspects of the present invention will become more apparent by describing in detail exemplary embodiments thereof with reference to the attached drawings, in which:

FIG. 1 is a view illustrating the configuration of a home network in the related art;

FIGS. 2A to 2D are views illustrating a procedure of performing the discovery, description, control, and eventing operations on a home network in the related art;

FIGS. 10A and 10B are views illustrating an example of a discovery message of the middleware device that supports the compatibility of devices on a home network according to an exemplary embodiment of the present invention;

FIGS. 11A and 11B are views illustrating an example of a control message of the middleware device that supports the compatibility of devices on a home network according to an exemplary embodiment of the present invention;

FIGS. 12A and 12B are views illustrating an example of an eventing message of the middleware device that supports the compatibility of devices on a home network according to an exemplary embodiment of the present invention.

DETAILED DESCRIPTION OF EXEMPLARY EMBODIMENTS OF THE INVENTION

Figure 2A:
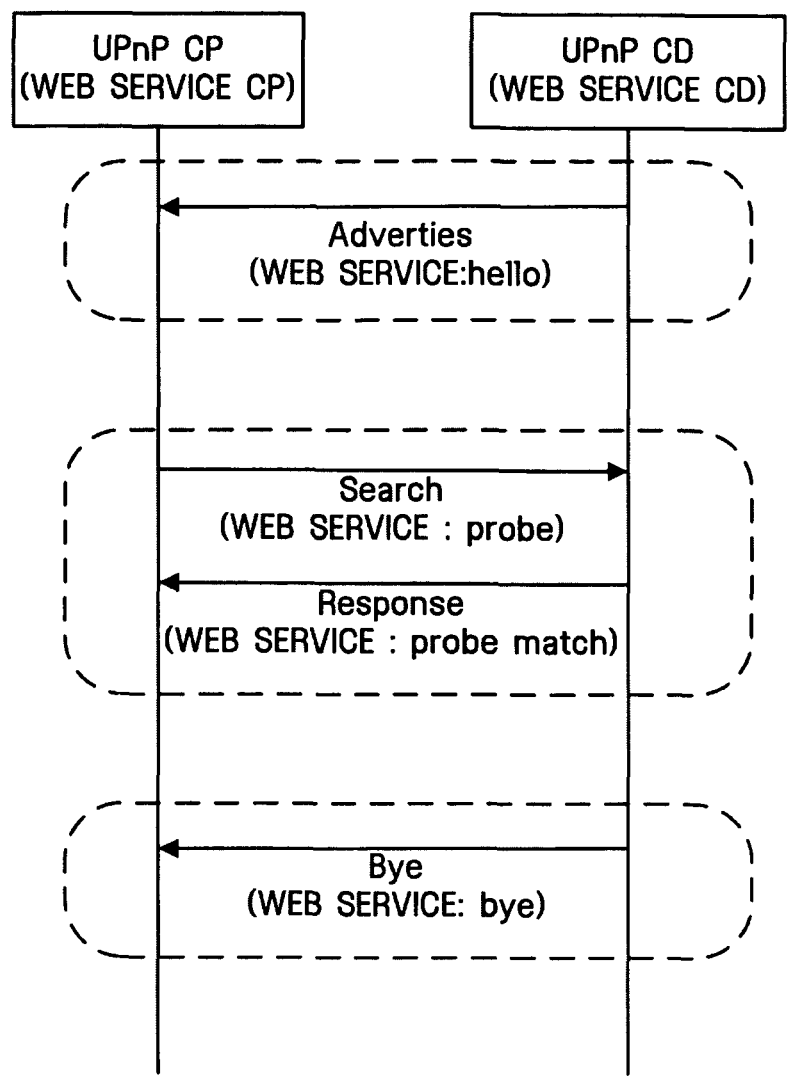
Figure 2B:
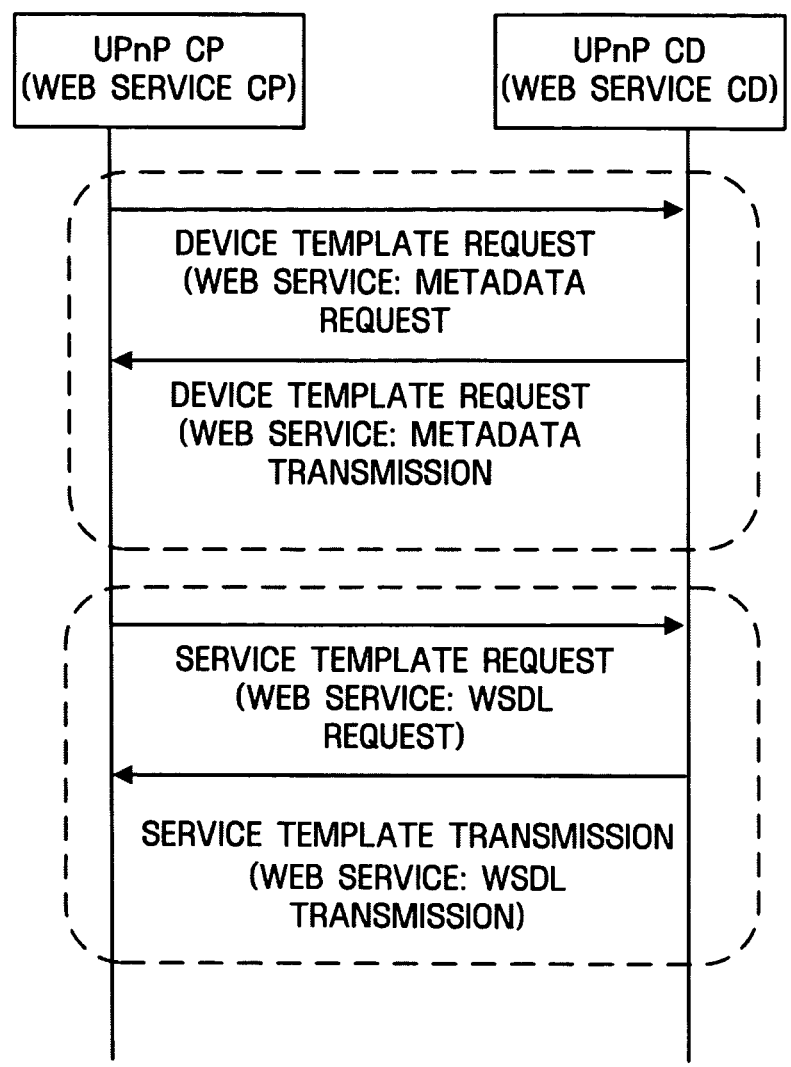
Figure 2D:
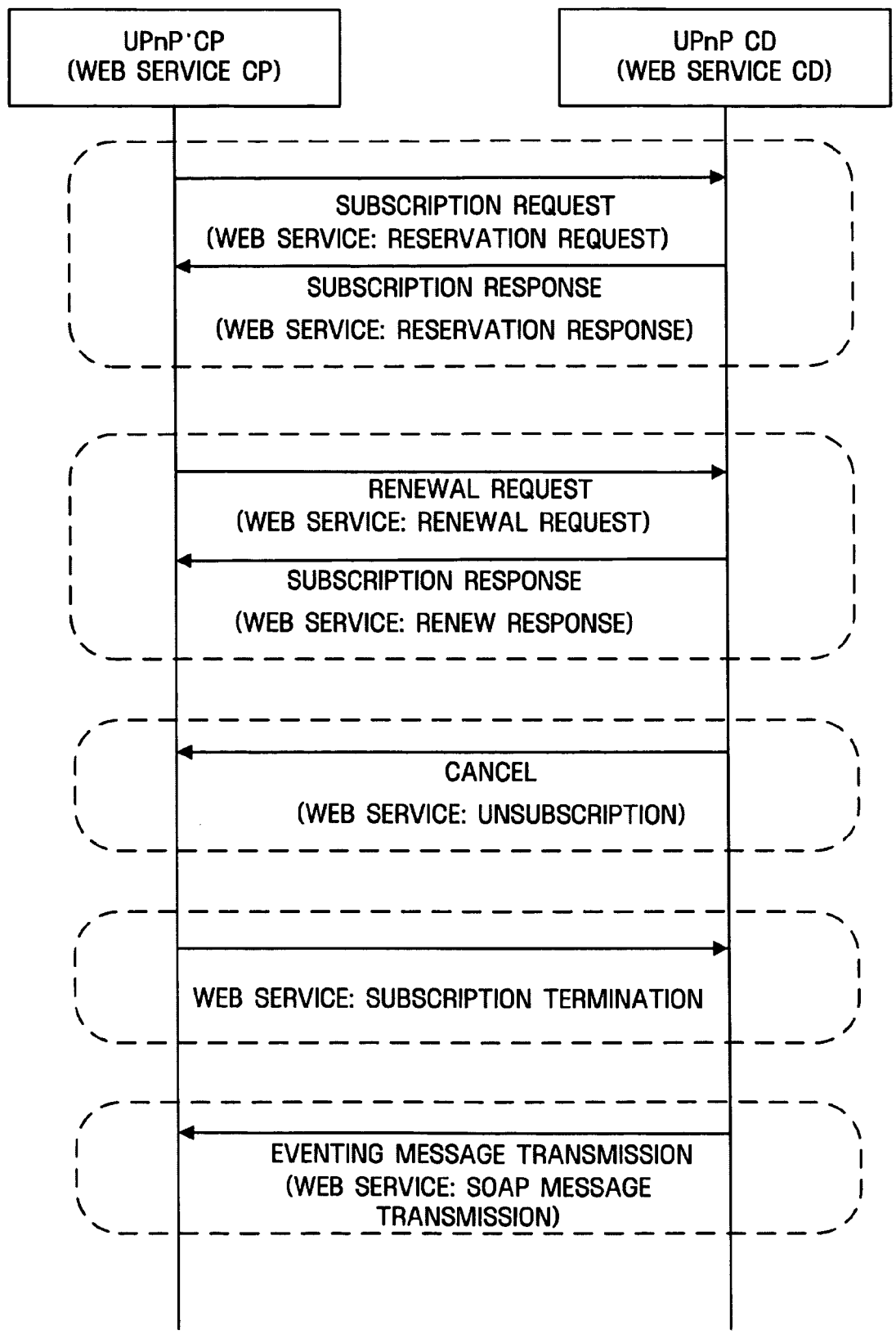

Aspects of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Exemplary embodiments of the present invention will now be described more fully with reference to the accompanying drawings.

Figure 3:
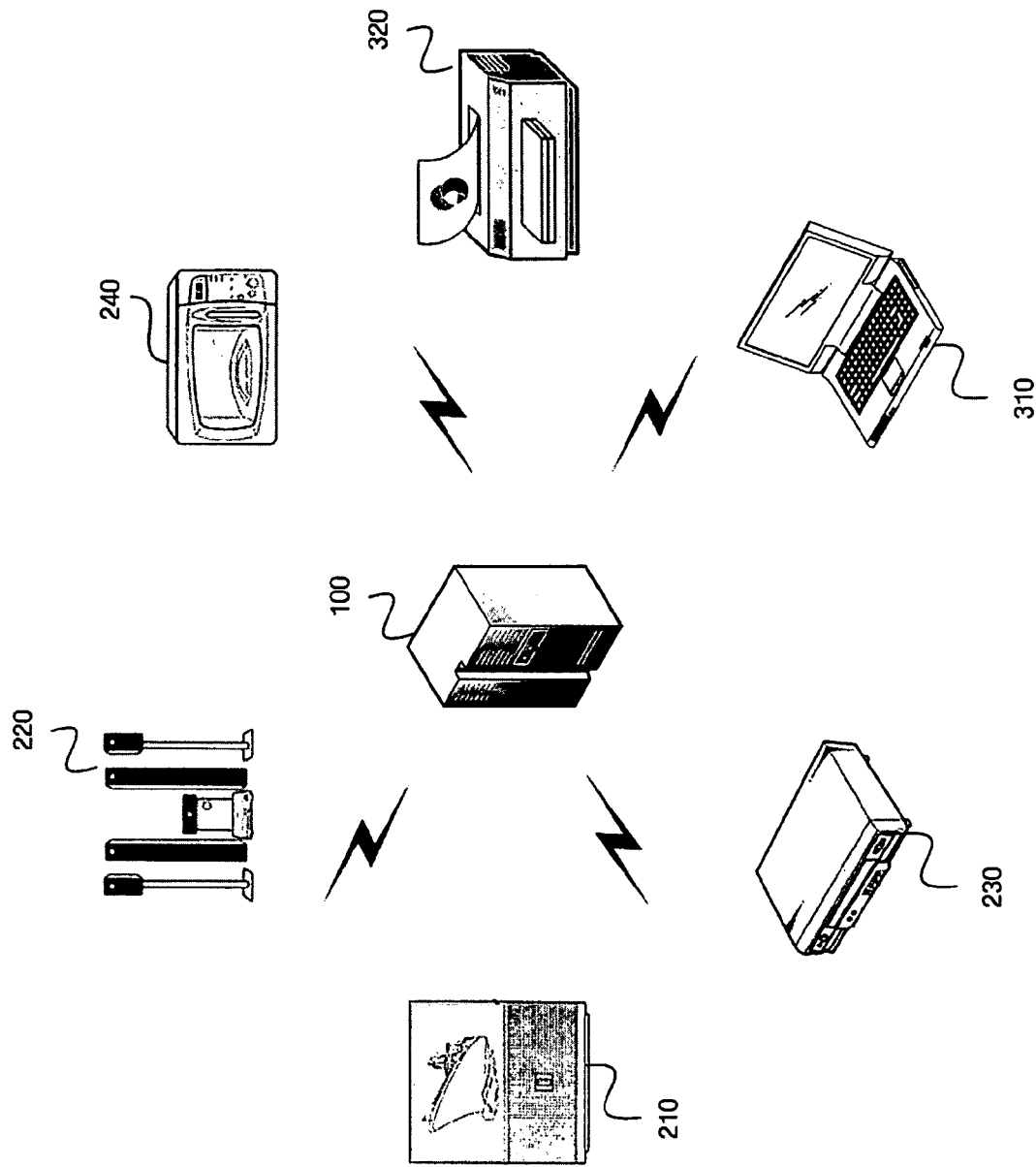
FIG. 3 is a view illustrating a home network system including a middleware device that supports compatibility of devices on a home network according to an exemplary embodiment of the present invention.

FIG. 3 is a view illustrating a home network system including a middleware device that supports compatibility of devices on a home network according to an exemplary embodiment of the present invention.

As shown in FIG. 3, the home network system has a structure in which a plurality of devices 210, 220, 230, and 240 based on UPnP and a plurality of devices 310 and 320 based on web service are interconnected by a network, and includes a middleware device 100 that supports both the UPnP and the web service. Here, a CP based on the UPnP is a DTV 210, and CDs based on the UPnP are a home theater 220, a DVD player 230, and a microwave oven 240. In addition, a CP based on the web service is a notebook 310, and a CD based on the web service is a printer 320.

Here, the middleware device converts and transmits UPnP protocol and web service protocol such that communication among all of the devices existing on a home network is possible. Accordingly, all of the devices, which are based on the UPnP and the web service, existing within the home network are compatible with one another.

Figure 4:
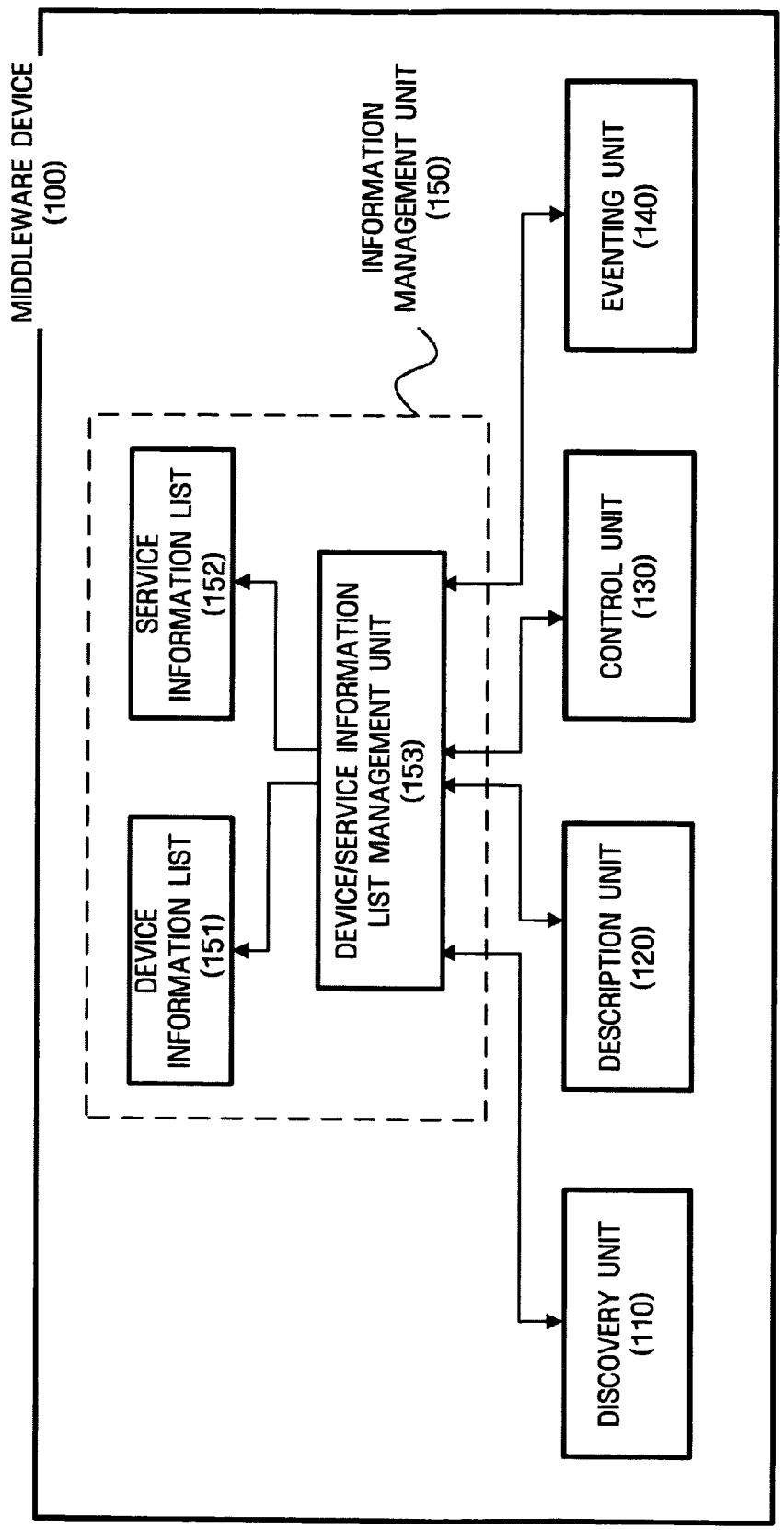
FIG. 4 is a block diagram illustrating the middleware device that supports the compatibility of devices on the home network according to an exemplary embodiment of the present invention.

FIG. 4 is a block diagram illustrating a middleware device that supports the compatibility of devices on the home network according to an exemplary embodiment of the present invention.

As shown in FIG. 4, the middleware device 100 includes a discovery unit 110, a description unit 120, a control unit 130, an eventing unit 140, and an information management unit 150.

The middleware device 100 according to an exemplary embodiment of the present invention provides an integrated solution with respect to the incompatibility of UPnP and web service by network middleware based on TCP/IP. Specifically, the middleware device 100 according to an exemplary embodiment of the present invention provides a control operation, in which the same message protocol called SOAP is used for the UPnP and the web service, and supports the UPnP and the web service at the same time in the discovery operation, the description operation, and the eventing operation.

The term "unit", as used herein, refers to, but is not limited to, a software or hardware component, such as a Field Programmable Gate Array (FPGA) or Application Specific Integrated Circuit (ASIC), which performs certain tasks. In an exemplary embodiment, a unit may be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units. Further, the components and units can be implemented to reproduce one or more CPUs within a device or a security multimedia card.

The discovery unit 110 distinguishes between a discovery message based on UPnP and a discovery message based on web service and converts these discovery messages that can be processed by both the UPnP and the web service. That is, the discovery unit 110 provides a mechanism by which a device using the UPnP can communicate with a device using the web service.

For example, UPnP discovery operation can be largely divided into two cases. In the first case, a new CD joins a network, and in the second case, a new CP joins the network.

In other words, when a new CD enters into a network, the new CD multicasts a message having basic information so that the new CD can be recognized. Here, the basic information includes a URL of description on a device that provides a CD, a device type, expiration time of a notification message, or the like.

On the other hand, in the case in which a new CP joins a network, when the CP multicasts a message for finding a CD that the CP desires to use, a corresponding CD transmits a response message to the CP that has multicast the message. The above-described mechanism is applied to a web service in the same manner.

However, the UPnP uses an SSDP based on an HTTP header as a protocol for providing a multicast discovery mechanism, while the web service uses a WS-Discovery protocol based on XML as a protocol for providing a multicast discovery mechanism. For this reason, the discovery unit 110 performs a message conversion between the UPnP and the web service related to a discovery message. Hereinafter, a detailed structure of the discovery unit 110 will be described with reference to FIG. 5.

The description unit 120 creates description XML files in the UPnP and the web service and converts the description XML files such that the UPnP and the web service can process the description XML files. That is, the description unit 120 supports the description operation in both the UPnP and the web service.

For example, the description unit 120 provides detailed information on the CD found by the discovery unit 110. In the description operation, the UPnP describes device and service as a device/service template defined in a predetermined format, and the web service describes detailed information on the service by WSDL. The device/service template and the WSDL are very different from each other in terms of a format or a detailed description format.

Accordingly, the description unit 120 converts the description XML files such that the UPnP and the web service can process the description XML files, and thus the CP can be provided with description information on the corresponding CD. Hereinafter, a detailed configuration of the description unit 120 will be described with reference to FIG. 6.

The control unit 130 converts control SOAP messages, which are different between the UPnP and the web service, such that the UPnP and the web service can process the control SOAP messages, and transmits the converted message to the corresponding CD. Hereinafter, a detailed configuration of the control unit 130 will be described.

The eventing unit 140 converts eventing messages, which are different between the UPnP and the web service, such that the UPnP and the web service can process the control SOAP messages, and transmits the converted eventing message to the corresponding CD or CP on the basis of corresponding CD information of a device/service information list management unit 153.

For example, when a CP desires to ascertain a change of the state of a CD, the middleware device 100 creates a subscription message and transmits the created subscription message to an eventing URL included in the information on the CD acquired in the discovery operation. Then, the CD registers the CP that has transmitted the subscription message and then transmits to the registered CP an eventing message including information on the change of the state.

The UPnP uses GENA as a protocol for the eventing operation, while the web service uses a WS-Eventing protocol as a protocol for the eventing operation. The two protocols provide a similar mechanism; however, the two protocols are different from each other in both message format and specification. Accordingly, the eventing unit 140 provides an eventing message that supports both the UPnP and the web service. Hereinafter, a detailed configuration of the eventing unit 140 will be described with reference to FIG. 8.

The information management unit 150 manages device/service information on CDs existing on a home network and includes a device information list 151, a service information list 152, and a device/service information list management unit 153.

The device information list 151 and the service information list 152 store, as list, information on CDs existing on the home network and service information provided by the corresponding CDs. Here, corresponding information does not have a structure dependent on the UPnP and the web service but includes information on whether each device or service is based on a UPnP or a web service.

The device/service information list management unit 153 manages the lists 150 and 160 that store the information on CDs existing on the home network and the service information provided by the corresponding CDs.

Further, the device/service information list management unit 153 continuously updates the device information list 151 and the service information list 152 in response to a request transmitted from the discovery unit 110.

Figure 5:
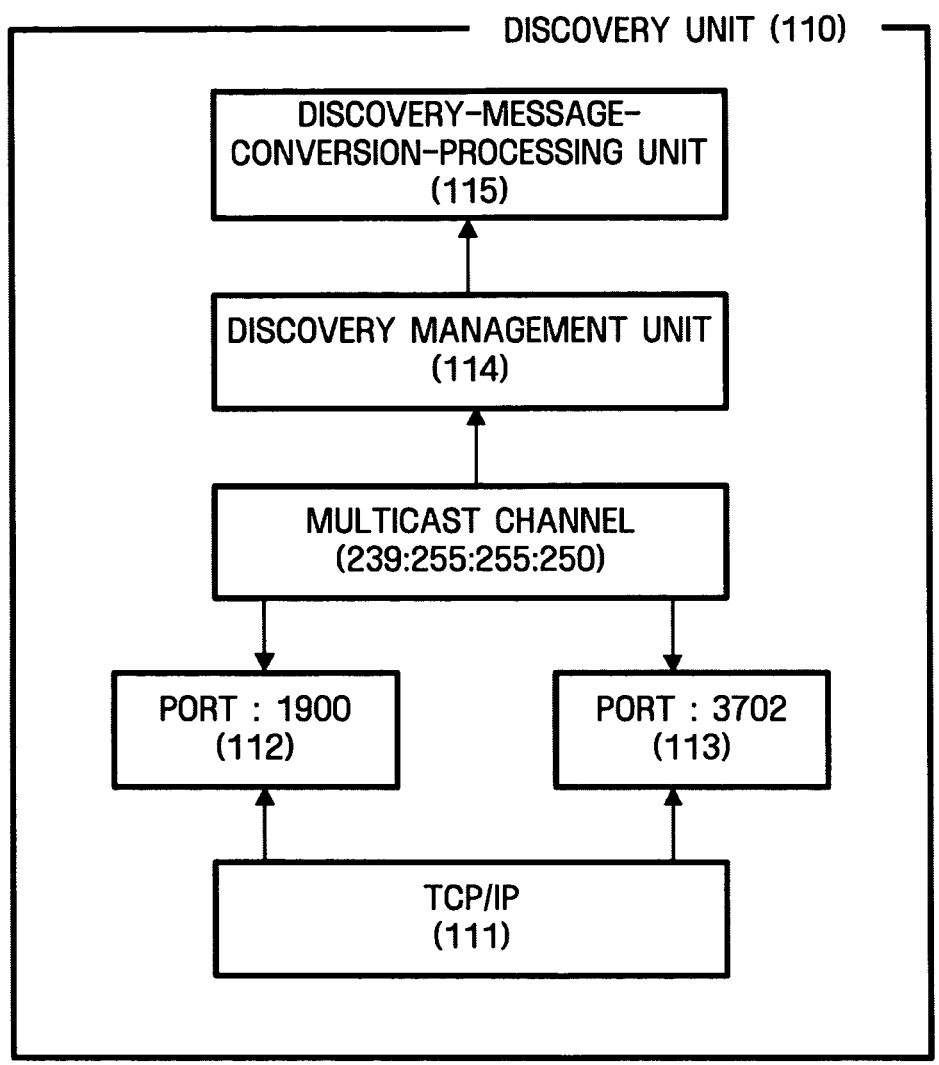
FIG. 5 is a block diagram illustrating a discovery unit of the middleware device shown in FIG. 4.

FIG. 5 is a block diagram illustrating the discovery unit of the middleware device shown in FIG. 4.

As shown in FIG. 5, the discovery unit 110 includes a TCP/IP 111, ports 112 and 113, a discovery management unit 114, and a discovery message conversion processing unit 115.

The TCP/IP 111 and lower communication layers (multicast channels; ports 112 and 113) transmit and receive multicast and unicast messages of the UPnP and the web service.

The discovery management unit 114 distinguishes between a discovery message based on the UPnP and a discovery message based on the web service and registers discovery information on a predetermined device in the device/service information list management unit 153.

In other words, the discovery management unit 114 distinguishes between a UPnP and a web service on the basis of characteristics (for example, UPnP is based on HTTP header and web service is based on SOAP) of each message or lower communication layer.

The discovery message conversion processing unit 115 converts the discovery message such that the discovery message can be processed in the UPnP and the web service. Here, the discovery message conversion processing unit 115 can manage and update protocols that may be different according to versions thereof and the UPnP and the web service.

For example, if a message received from a multicast channel is an Alive (or Hello) message, CD information included in the message is transmitted to the information management unit 150. At this time, the CD information included in the message is transmitted to a port 1900 (112) in the case of an SSDP message, and the CD information included in the message is transmitted to a port 3702 (113) in the case of a WS-Discovery message. Thus, messages multicast in the discovery operation may be classified into the SSDP message and the WS-Discovery message according to a port used. In addition, an "Alive message" is transmitted in the case of the UPnP, and a "Hello message" is transmit in the case of the web service.

Thereafter, the information management unit 150 checks whether or not the corresponding CD is registered. Then, if the corresponding CD is not registered, the information management unit 150 reads description information on the corresponding CD on the basis of a discovery message and then registers the description information in the information lists 151 and 152.

Furthermore, in the case when a message received from a multicast channel is an Alive (or Hello) message and a corresponding CD is registered in the information management unit 150, discovery information on the corresponding CD is requested of the information management unit 150, and then, in accordance with protocols registered in the discovery message conversion processing unit 115, the Alive (or Hello) message is converted into a message protocol supported by a web service in the case of a UPnP and a message protocol supported by the UPnP in the case of the web service. Then, the Alive (or Hello) message is multicast on the home network.

Furthermore, in the case when the message received from the multicast channel is a Search (or Probe) message, the CD information included in the message is transmitted to the information management unit 150.

Then, the information management unit 150 checks whether there is a CD corresponding to the CD information included in the message. Then, if there is no registered CD corresponding to the CD information, the information management unit 150 multicasts the Search (or Probe) message and then registers a corresponding CD. Here, the "Search message" is transmitted in the case of the UPnP and the "Probe message" is transmitted in the case of the web service.

Further, in the case when a message received from a multicast channel is a Search (or Probe) message and a corresponding CD is registered in the information management unit 150, discovery information on the corresponding CD is requested of the information management unit 150, and then, in accordance with protocols registered in the discovery message conversion processing unit 115, a response message with respect to the Search (or Probe) message is converted into a message protocol supported by a web service in the case of a UPnP and a message protocol supported by the UPnP in the case of the web service. Then, the response message is transmitted to a CP that has transmitted the Search (or Probe) message.

Figure 6:
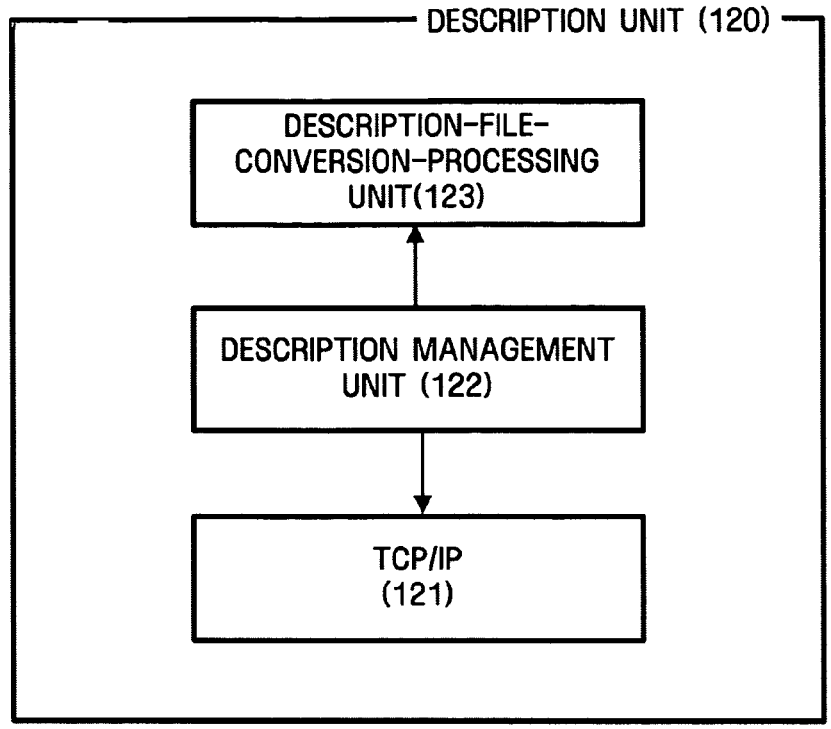
FIG. 6 is a block diagram illustrating a description unit of the middleware device shown in FIG. 4.

FIG. 6 is a block diagram illustrating the description unit of the middleware device shown in FIG. 4.

As shown in FIG. 6, the description unit 120 includes a TCP/IP 121, a description management unit 122, and a description file conversion processing unit 123.

The TCP/IP 121 provides description information in response to a request of a predetermined CP, on the basis of HTTP.

The description management unit 122 creates description XML files of the UPnP and the web service on the basis of the corresponding CD information of the information management unit 150 and then provides the created description XML files to the corresponding CP. Here, the description management unit 122 creates the description XML files on the basis of a protocol supported by the corresponding CD.

The description file conversion processing unit 123 converts the description XML files such that the UPnP and the web service can process the description XML files. Here, the description file conversion processing unit 123 can manage and update protocols that may be different according to versions thereof and the UPnP and the web service.

Figure 7:
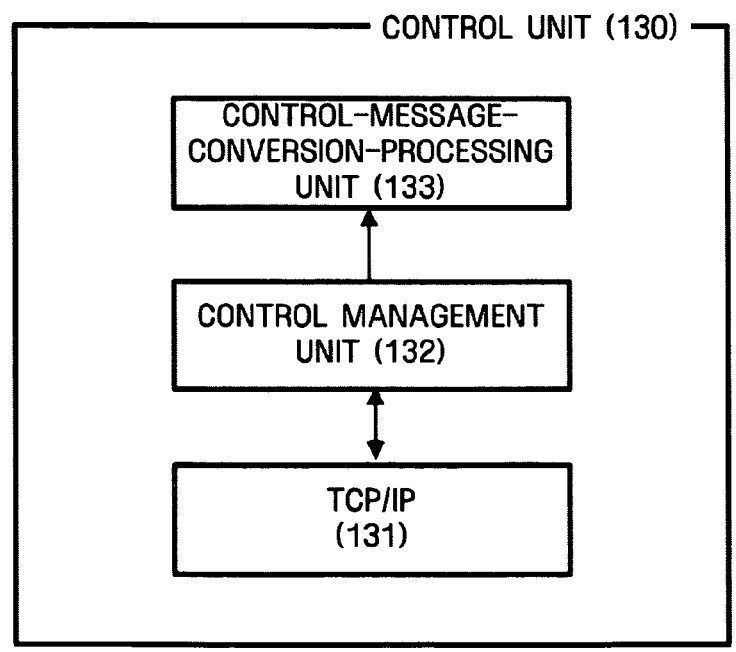
FIG. 7 is a block diagram illustrating a control unit of the middleware device shown in FIG. 4.

FIG. 7 is a block diagram illustrating the control unit of the middleware device shown in FIG. 4.

As shown in FIG. 7, the control unit 130 includes a TCP/IP 131, a control management unit 132, and a control message conversion processing unit 133.

The TCP/IP 131 provides a function of receiving and transmitting an HTTP post message on the basis of HTTP.

The control management unit 132 converts SOAP messages, which are different between the UPnP and the web service, by using the control message conversion processing unit 133 and transmits the converted control SOAP message to the corresponding CD or CP on the basis of corresponding CD information of the device/service information list management unit 153.

The control message conversion processing unit 133 converts the SOAP messages, which are different between the UPnP and the web service, such that the UPnP and the web service can process the SOAP messages. Further, the control message conversion processing unit 133 manages and updates a conversion protocol of a control message.

Figure 8:
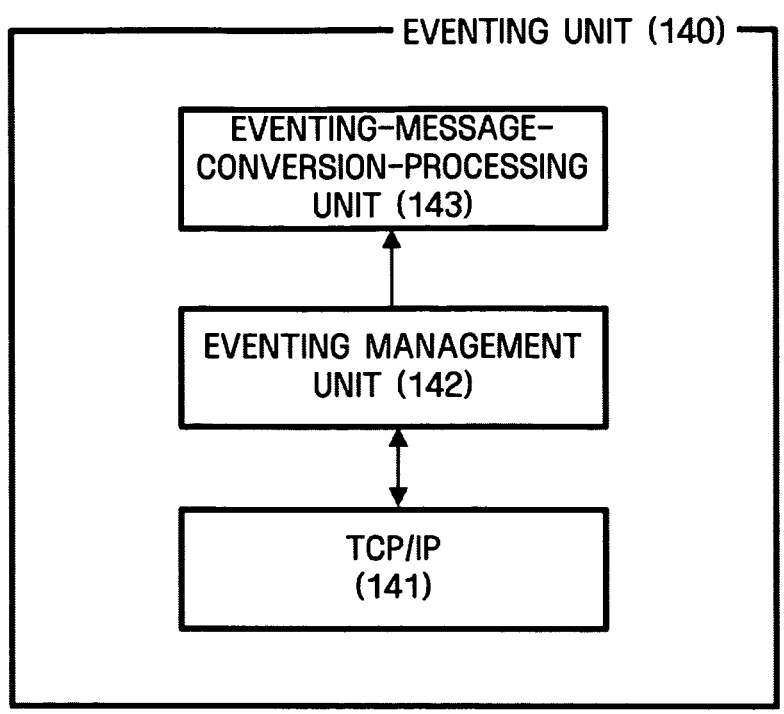
FIG. 8 is a block diagram illustrating an eventing unit of the middleware device shown in FIG. 4.

FIG. 8 is a block diagram illustrating the eventing unit of the middleware device shown in FIG. 4.

As shown in FIG. 8, the eventing unit 140 includes a TCP/IP 141, an eventing management unit 142, and an eventing message conversion processing unit 143.

The TCP/IP 141 provides a function of receiving and transmitting an HTTP post message on the basis of HTTP.

The eventing management unit 142 converts eventing messages, which are different between the UPnP and the web service, by using the eventing message conversion processing unit 143 and transmits the converted eventing message to the corresponding CD or CP on the basis of corresponding CD information of the device/service information list management unit 153.

The eventing message conversion processing unit 143 converts the eventing messages, which are different between the UPnP and the web service, such that the UPnP and the web service can process the eventing messages. Further, the eventing message conversion processing unit 143 manages and updates a conversion protocol of an eventing message.

Figure 9:
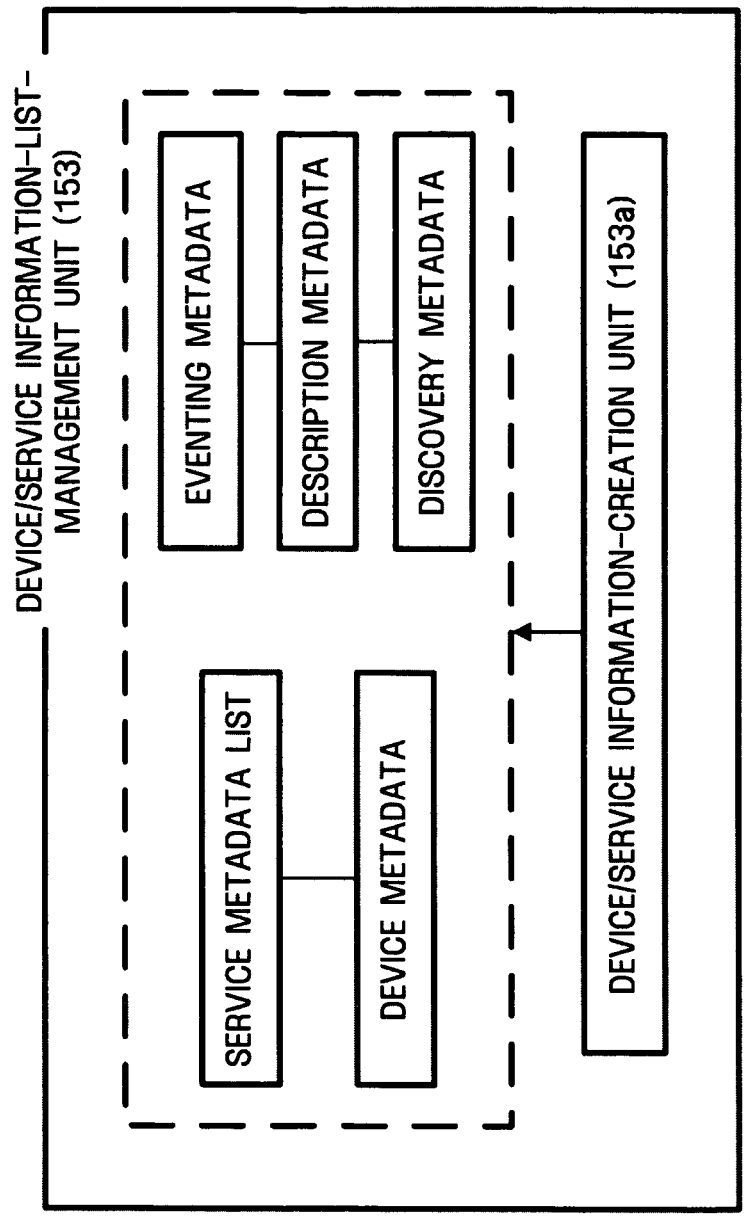
FIG. 9 is a view illustrating a procedure of creating information by means of a device/service information list management unit of the middleware device shown in FIG. 4.

FIG. 9 is a view illustrating a procedure of creating information by means of the device/service information list management unit of the middleware device shown in FIG. 4.

As shown in FIG. 9, when the device/service information list management unit 153 receives information by which description corresponding to a predetermined device can be acquired through the discovery operation, the device/service information list management unit 153 creates all metadata information by means of a device/service information creation unit 153a.

The device/service information creation unit 153a acquires the device description information, thereby forming the device metadata. Here, the device metadata refers to all information that can be acquired in connection with the corresponding device independently of UPnP and web service formats. At this time, the device/service information creation unit 153a creates a discovery message, a description message, a control message, and an eventing message.

That is, the device/service information creation unit 153a forms the discovery metadata on the basis of information provided in the discovery operation, in association with each device/service metadata. Here, the discovery metadata refers to all information that can be acquired in connection with discovery mechanism of the corresponding device or service independently of UPnP and web service formats.

For example, the discovery management unit 114 requests the device/service information creation unit 153a to create a response message with respect to an Alive message (or Hello message).

In response to the request, the device/service information creation unit 153a creates a discovery message format based on the SSDP protocol in the case of the UPnP and creates a discovery message format based on the WS-discovery protocol in the case of the web service. Here, the corresponding format is obtained through the discovery metadata.

Then, a discovery message is created on the created discovery message format.

Further, the device/service information creation unit 153*a* forms the description metadata in association with each device/service metadata and forms an eventing metadata in association with service metadata. Here, the description metadata refers to all information that can be acquired in connection with description mechanism of the corresponding device or service independently of UPnP and web service formats. On the other hand, in the UPnP and the web service, devices do not support the eventing mechanism. That is, the eventing is applied to only the service.

For example, if a CP requests description information on a predetermined CD, the description management unit 122 checks whether the description is UPnP XML description or web-service-based WS-description on the basis of the requested message.

Then, the device/service information creation unit 153*a* creates UPnP XML description information on the basis of the description metadata if the description information requested on the basis of the description management unit 122 is related to the UPnP, and the device/service information creation unit 153*a* creates web-service-based WS-description on the basis of the description metadata if the requested description information is related to the web service.

Further, the device/service information creation unit 153*a* can acquire service description information included in the device description. In addition, the device/service information creation unit 153*a* acquires the service description information based on data, thereby forming service metadata. Here, the service can provide a plurality of service description information corresponding to respective devices. Thus, a specific device and a service list corresponding to the specific device are associated with each other, and the association is described in the device metadata and the service metadata.

FIGS. 10A and 10B are views illustrating an example of a discovery message of the middleware device that supports the compatibility of devices on a home network according to an exemplary embodiment of the present invention. Here, FIG. 10A illustrates an Alive message of the UPnP, and FIG. 10B illustrates a Hello message of the web service.

As shown in FIG. 10A, denoted parts shown in FIG. 10A are essential information for forming the discovery metadata, and the other parts are information that is basically supported by a framework, which is defined or created according to the framework.

For example, LOCATION header (1) of the UPnP SSDP message has an URL that ends with .XML, and SSDP: alive is described in NTS header (2). Further, UPnP/1.0 tag is described in SERVER header (3). Accordingly, it is possible to recognize the UPnP SSDP by analyzing header parts of a message.

As shown in FIG. 10B, denoted parts (09), (21), (25), and (29) shown in FIG. 10B are essential information for forming the discovery metadata, and the other parts are information basically supported by a framework, which is defined or created according to the framework.

For example, it is possible to recognize WS-discovery message through the action part (09) of the header included in the WS-discovery message.

FIGS. 11A and 11B are views illustrating an example of a control message of the middleware device that supports the compatibility of devices on a home network according to an exemplary embodiment of the present invention. Here, FIG. 11A illustrates a UPnP SOAP control message, and FIG. 11B illustrates a web service SOAP control message.

As shown in FIGS. 11A and 11B, both the UPnP and the web service use a SOAP message protocol. However, SOAP message formats of the UPnP and the web service are considerably different from each other, as illustrated in the example.

For example, the UPnP and the web service use the same protocol but use different formats. However, even though the formats are different, the content of transmitted information included in the formats does not differ. That is, if the web service proceeds to UPnP device architecture version 2.0, a value of each element is defined on the basis of a service specification defined by UPnP working committee.

FIGS. 12A and 12B are views illustrating an example of an eventing message of the middleware device that supports the compatibility of devices on a home network according to an exemplary embodiment of the present invention. Here, FIG. 12A illustrates a UPnP GENA subscription message, and FIG. 12B illustrates a web service eventing subscription message.

As shown in FIGS. 12A and 12B, denoted parts are information necessary at the time of a subscription request, and the other parts are information created according to each protocol. In particular, in the case of a WS-eventing, information on related action and addressing information are provided in the SOAP header on the basis of web service specification, and options such as a filter function can be additionally set. Here, a CP can be notified that the options are disregarded or not supported according to each protocol.

Figure 13A:
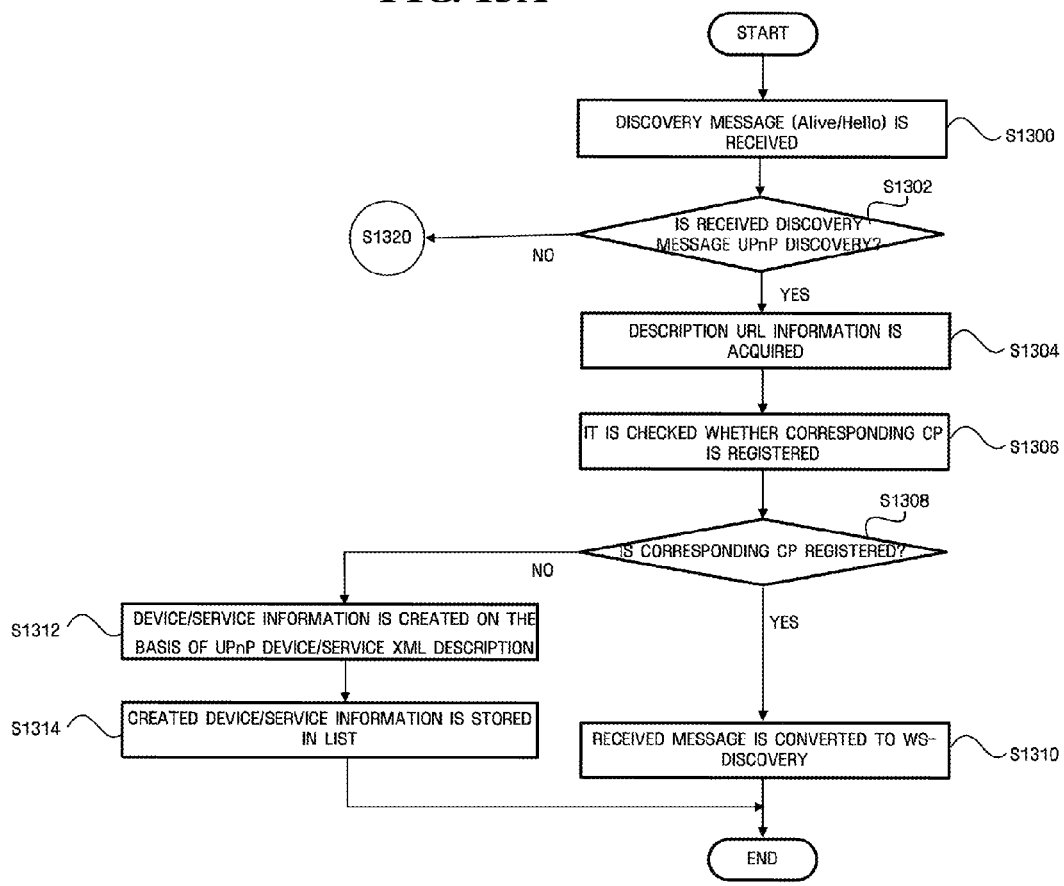
FIGS. 13A and 13B are flowcharts illustrating a procedure of processing the discovery Alive (or Hello) message in a method of supporting the compatibility of devices on a home network according to an exemplary embodiment of the present invention.
Figure 13B:
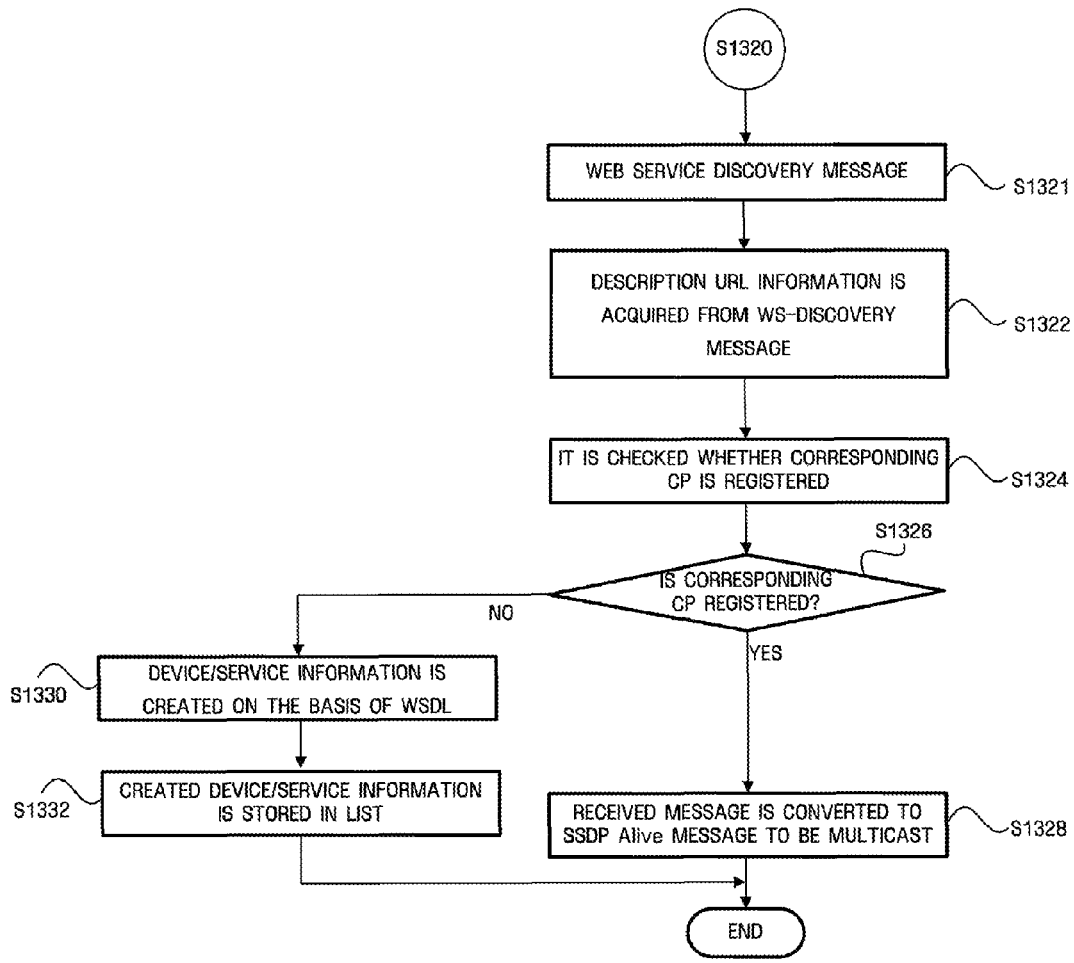

FIGS. 13A and 13B are flowcharts illustrating a procedure of processing the discovery Alive (or Hello) message in a method of supporting the compatibility of devices on a home network according to an exemplary embodiment of the present invention.

First, the discovery management unit 114 receives a discovery message (for example, Alive message in the case of UPnP CP, and Hello message in the case of web service CP) that finds a CD to be controlled, which is transmitted from a UPnP CP or a web service CP existing on a home network, through a multicast channel (S1300).

Then, the discovery management unit 114 checks whether the transmitted discovery message is a UPnP discovery message or a web service message. Here, the UPnP has an SSDP format, and the web service has a WS-Discovery format. Further, since an SSDP message is transmitted to the "port 1900" and a WS-Discovery message is received at the "port 3702", it is possible to check whether the transmitted message is a UPnP discovery message or a web service message on the basis of a port used.

If it is determined that the message is a UPnP discovery message (S1302), the discovery management unit 114 acquires device/service description URL information included in the SSDP message (S1304) and transmits the acquired description URL information to the device/service information list management unit 153.

Subsequently, the device/service information list management unit 153 checks whether or not a corresponding CP is registered in a currently managed device/service information list on the basis of the information transmitted from the discovery management unit 114 (S1306).

If it is determined that the corresponding CP exists in the device/service information list (S1308), the information on the corresponding CP is not stored in the device/service information list management unit 153. Then, the discovery management unit 114 converts the received SSDP Alive message to the WS-Discovery Hello message through the discovery message conversion processing unit 115 and then multicasts the converted Hello message (S1310).

On the other hand, if it is determined that the corresponding CP does not exist in the device/service information list (S1308), the device/service information list management unit 153 parses the UPnP device/service XML description information on the corresponding CP and then creates device/service information independent on UPnP and web service on the basis of the description information (S1312). Then, created device/service information is stored in the device information list 151 and the device information list 152 (S1314).

Further, as a result of the check of the discovery management unit 114, if the transmitted discovery message is a web service message (S1321), the discovery management unit 114 acquires device/service description URL information included in the WS-Discovery message (S1322) and transmits the acquired description URL information to the device/service information list management unit 153.

Subsequently, the device/service information list management unit 153 checks whether or not a corresponding CP is registered in a currently managed device/service information list on the basis of the information transmitted from the discovery management unit 114 (S1324).

If it is determined that the corresponding CP exists in the device/service information list (S1326), the information on the corresponding CP is not stored in the device/service information list management unit 153. Then, the discovery management unit 114 converts the received WS-Discovery Hello message to the SSDP Alive message through the discovery message conversion processing unit 115 and then multicasts the converted Alive message (S1328).

On the other hand, if it is determined that the corresponding CP does not exist in the device/service information list (S1326), the device/service information list management unit 153 searches and parse WSDL and then creates device/service information independent on the UPnP and web service on the basis of the WSDL (S1330). Then, created device/service information is additionally stored in the device information list 151 and the device information list 152 (S1332).

Figure 14A:
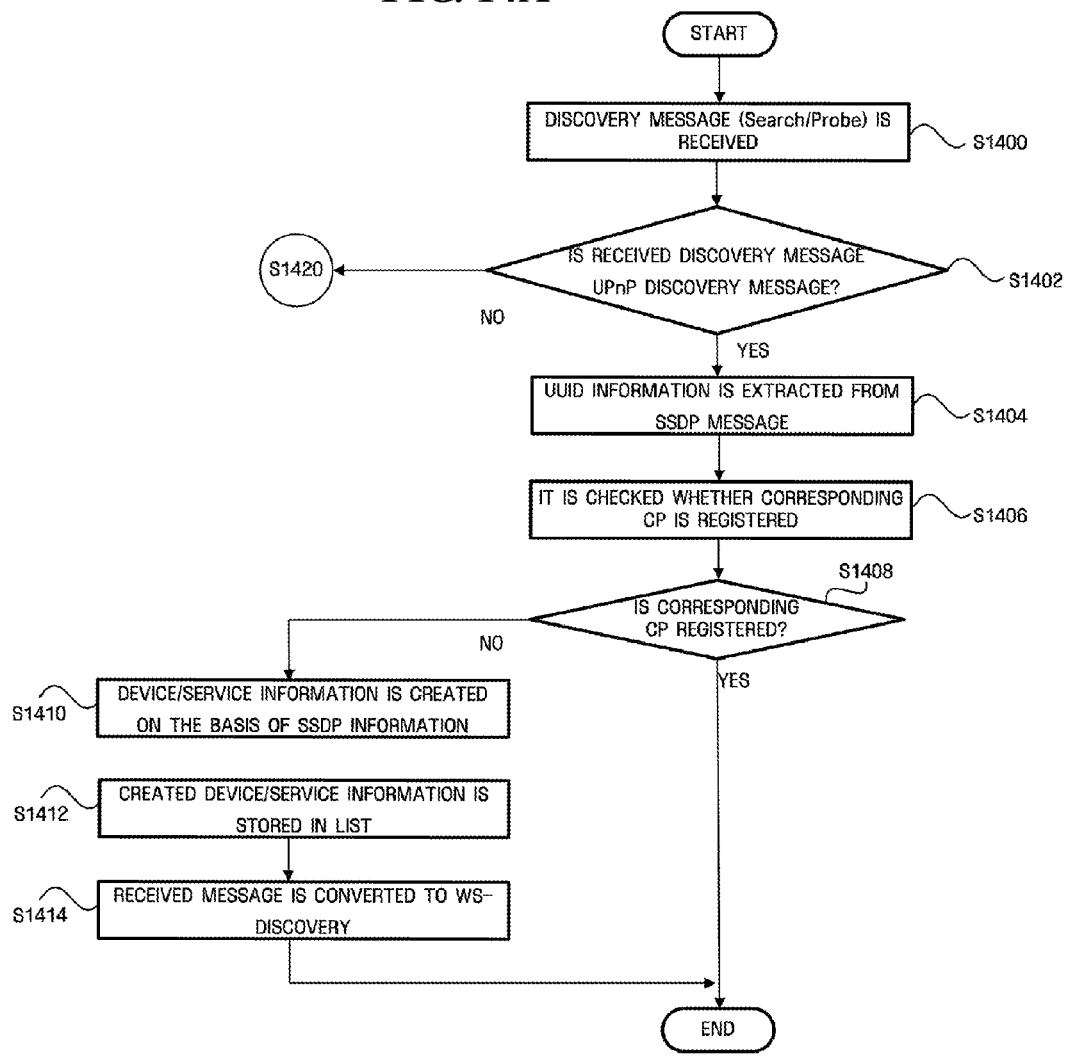
FIGS. 14A and 14B are flowcharts illustrating a procedure of processing the discovery Search (or Probe) message in the method of supporting the compatibility of devices on a home network according to an exemplary embodiment of the present invention.
Figure 14B:
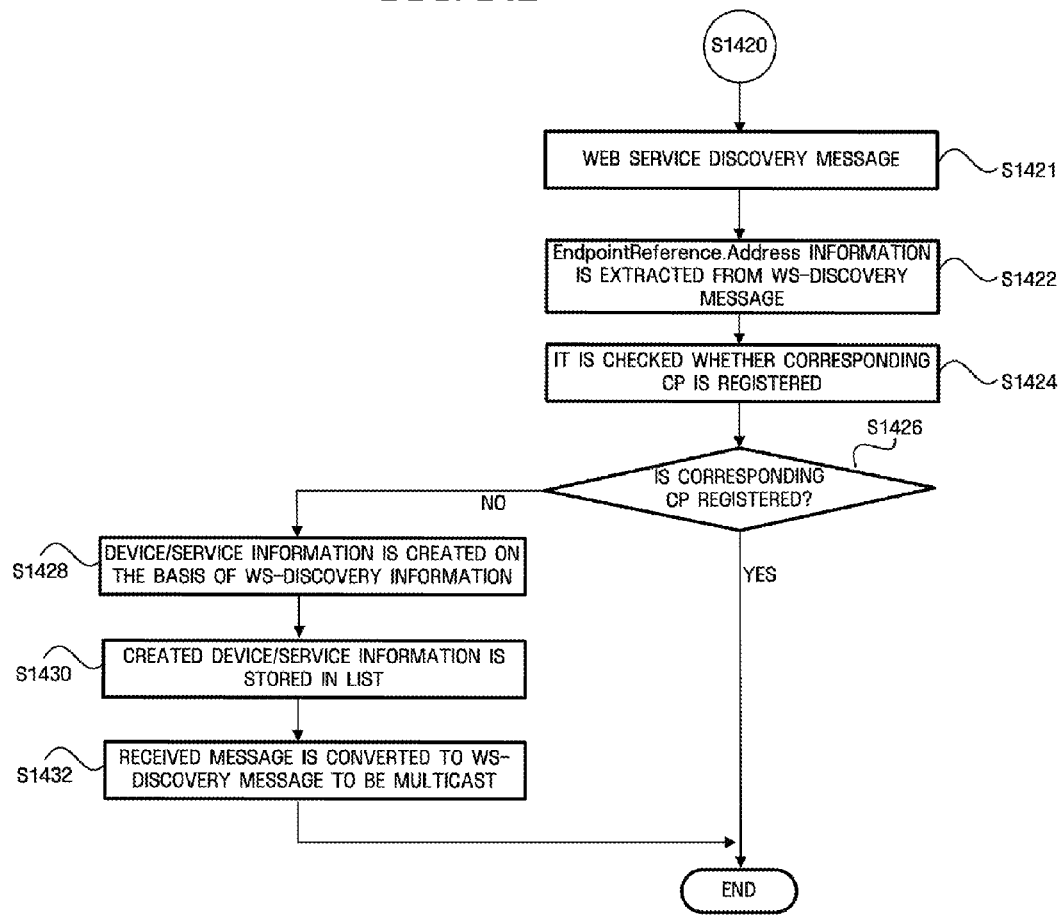

FIGS. 14A and 14B are flowcharts illustrating a procedure of processing the discovery Search (or Probe) message in the method of supporting the compatibility of devices on a home network according to an exemplary embodiment of the present invention.

First, the discovery management unit 114 receives a discovery message (for example, Search message in the case of UPnP CP, and Probe message in the case of web service CP), which is transmitted from a UPnP CP or a web service CP existing on a home network, through a multicast channel (S1400).

Then, the discovery management unit 114 checks whether the transmitted discovery message is a UPnP discovery message or a web service message. Here, the UPnP has an SSDP format, and the web service has a WS-Discovery format.

If it is determined that the message is a UPnP discovery message (S1402), the discovery management unit 114 extracts UUID information from the SSDP message (S1404) and transmits the extracted UUID information to the device/service information list management unit 153.

Subsequently, the device/service information list management unit 153 checks whether or not a corresponding CP is registered in a currently managed device/service information list on the basis of the information transmitted from the discovery management unit 114 (S1406).

If it is determined that the corresponding CP exists in the device/service information list (S1408), the device/service information list management unit 153 terminates without storing the information on the corresponding CP.

On the other hand, if it is determined that the corresponding CP does not exist in the device/service information list (S1408), the discovery management unit 114 provides the SSDP information to the device/service information list management unit 153, and the device/service information list management unit 153 creates the corresponding device/service information on the basis of the SSDP information and then stores the created device/service information in the device/service information lists 151 and 152 (S1410 and S1412).

Then, the transmitted UPnP discovery message is converted to the WS-Discovery message to be multicast (S1414).

Further, as a result of the check of the discovery management unit 114, if it is determined that the transmitted discovery message is a web service message (S1421), the discovery management unit 114 extracts "EndpointReference.Address" from the WS-Discovery message (S1422) and then transmits the extracted information to the device/service information list management unit 153 (refer to FIG. 14B).

Subsequently, the device/service information list management unit 153 checks whether or not a corresponding CP is registered in a currently managed device/service information list on the basis of the information transmitted from the discovery management unit 114 (S1424).

If it is determined that the corresponding CP exists in the device/service information list (S1426), the device/service information list management unit 153 terminates without storing the corresponding CP.

On the other hand, if it is determined that the corresponding CP does not exist in the device/service information list (S1426), the device/service information list management unit 153 creates corresponding device/service information on the basis of the WS-Discovery information and then additionally stores the created device/service information in the device/service information lists 151 and 152 (S1428 and S1430).

Then, the transmitted WS-Discovery message is converted to the UPnP discovery message to be multicast (S1432).

Figure 15:
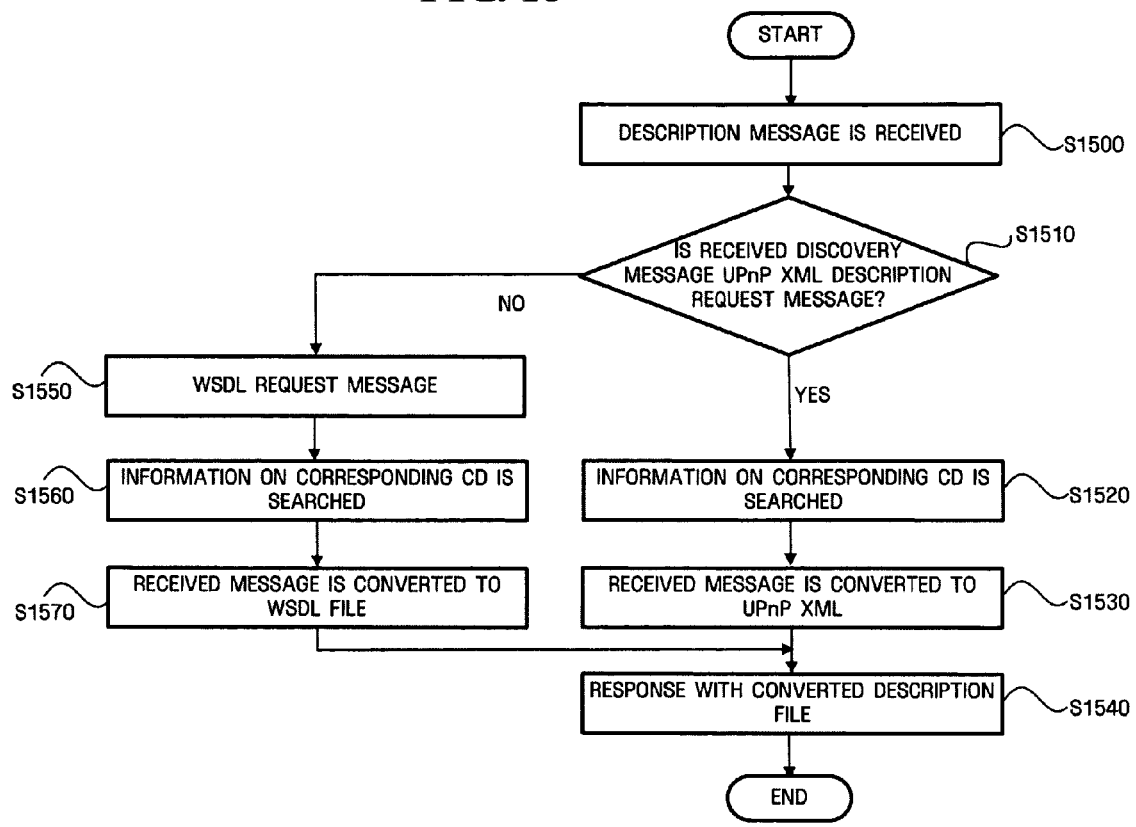
FIG. 15 is a flowchart illustrating a description operation in the method of supporting the compatibility of devices on a home network according to an exemplary embodiment of the present invention.

FIG. 15 is a flowchart illustrating the description operation in the method of supporting the compatibility of devices on a home network according to an exemplary embodiment of the present invention.

First, the description management unit 122 receives a description request message for obtaining description from a CP existing on a home network (S1500).

Then, the description management unit 122 checks whether the transmitted description request message is a UPnP XML description request message or web service WSDL request message (S1510).

If it is determined that the transmitted description request message is the UPnP XML description request message, the description file conversion processing unit 123 requests the device/service information list management unit 153 to search for the corresponding CD, and in response to the request, the device/service information list management unit 153 searches the corresponding CD (S1520).

As the search result, if it is determined that the corresponding CD is a CD that originally supports a web service, the description file conversion processing unit 123 performs a conversion to the UPnP XML description file on the basis of device/service information (S1530).

Then, the description management unit 122 responds with a converted description response message (for, UPnP XML description file) (S1540).

On the other hand, if it is determined that the transmitted description request message is a WSDL request message (S1550), the description file conversion processing unit 123 requests the device/service information list management unit 153 to search for the corresponding CD, and in response to the request, the device/service information list management unit 153 searches the corresponding CD (S1560).

As the search result, if it is determined that the corresponding CD is a CD that originally supports a UPnP, the description file conversion processing unit 123 performs a conversion to the WSDL file on the basis of corresponding device/service information (S1570).

Then, the description management unit 122 responds with a converted description response message (for, WSDL file) (S1540).

Figure 16A:
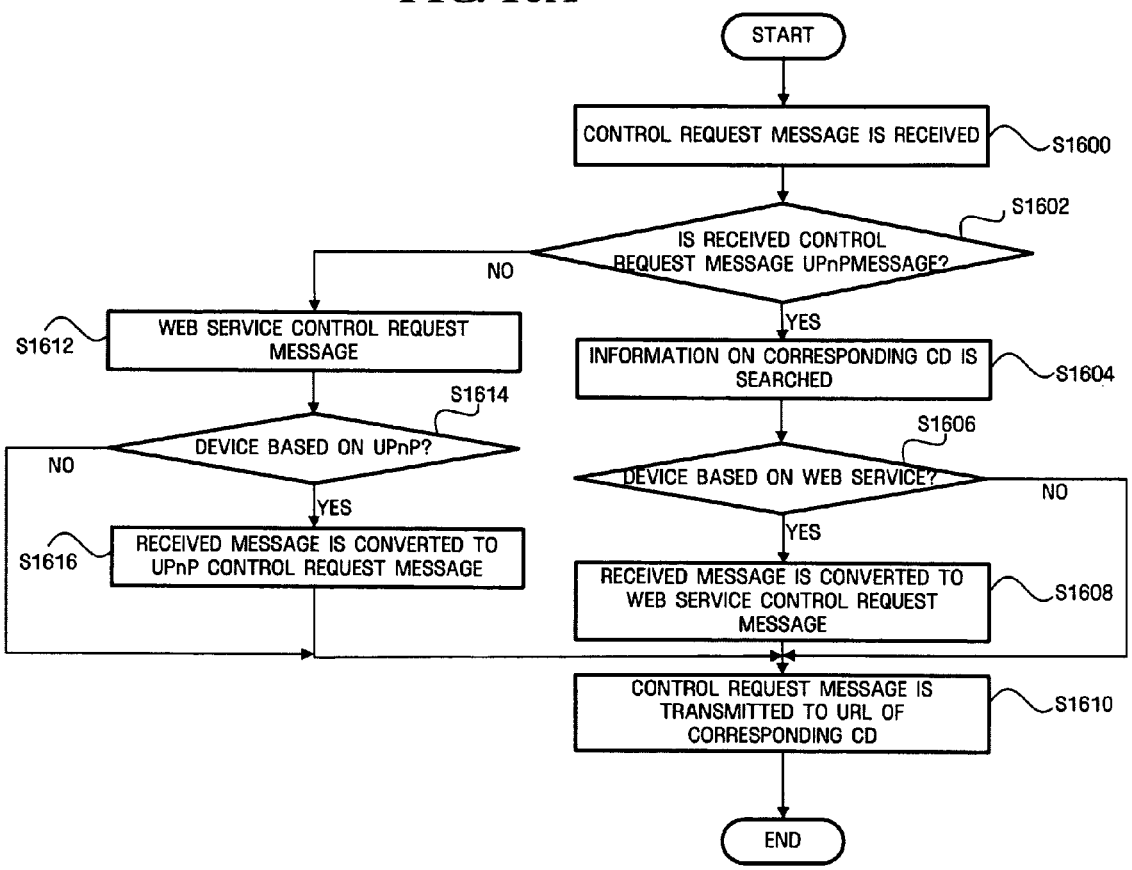
FIGS. 16A and 16B are flowcharts illustrating a control operation in the method of supporting the compatibility of devices on a home network according to an exemplary embodiment of the present invention.
Figure 16B:
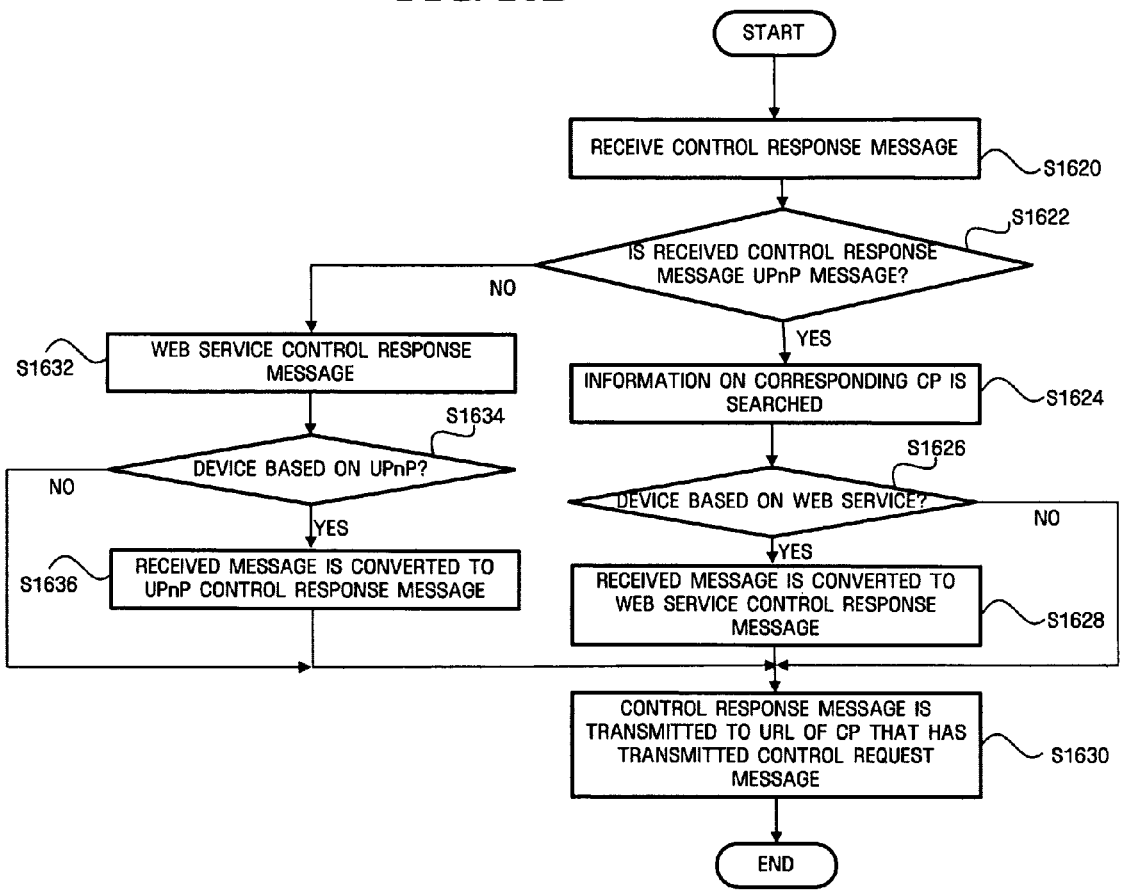

FIGS. 16A and 16B are flowcharts illustrating the control operation in the method of supporting the compatibility of devices on a home network according to an exemplary embodiment of the present invention. Here, the control operation is divided into a procedure of processing a control request message and a procedure of processing a control response message.

FIG. 16A is a flowchart illustrating the procedure of processing the control request message.

First, when the control request message is transmitted from a CP existing on the home network, the control management unit 132 checks whether the control request message is a UPnP control request message or a web service control request message. In this case, since the device/service description includes information by which control Action can be received, it is possible to distinguish whether the control request message is the UPnP control request message or the web service control request message on the basis of description of the corresponding CD.

As a result of the check of the control management unit 132, if it is determined that the control request message is the UPnP control request message (S1602), the control management unit 132 searches whether the CD that the CP having transmitted the control request message desires to control is based on the UPnP or the web service (S1604).

As the search result, if it is determined that the corresponding CD is based on the web service (S1606), the control message conversion processing unit 133 converts the corresponding UPnP control request message to the web service control request message (S1608).

Then, the control management unit 132 searches URL information of the corresponding CD, to which the control request has been transmitted, through the device/service information list management unit 153 and then transmits a request message converted to the searched URL (S1610).

As a result of the check of the control management unit 132, if it is determined that the control request message is the web service control request message (S1612), the control management unit 132 searches whether the CD that the CP having transmitted the control request message desires to control is based on the UPnP or the web service (S1614).

As the search result, if it is determined that the corresponding CD is based on the UPnP (S1614), the control message conversion processing unit 133 converts the corresponding UPnP control request message to the web service control request message (S1616).

Then, the control management unit 132 searches URL information of the corresponding CD, to which control request has been transmitted, through the device/service information list management unit 153 and then transmits a request message converted to the searched URL (S1610).

FIG. 16B is a flowchart illustrating the procedure of processing the control response message.

First, after performing an operation of processing the control request message, the control management unit 132 receives a response message with respect to a request message transmitted to a CD existing on the home network (S1620).

Then, the control management unit 132 checks whether the corresponding response message is a UPnP message or a web service message.

As the check result, if it is determined that the response message is the UPnP control response message (S1622), the control management unit 132 searches whether the CP to which the corresponding response message is to be transmitted is based on the UPnP or the web service (S1624).

As the search result, if it is determined that the corresponding CP is based on the web service (S1626), the control message conversion processing unit 133 converts the corresponding UPnP control response message to the web service control request message (S1628).

Then, the control management unit 132 searches URL information of a CP that has transmitted the previous control request message through the device/service information list management unit 153 and then transmits a request message converted to the searched URL (S1630). Here, the URL information of the control request CP is temporarily stored during an operation of processing the control request message and is used during an operation of processing the control response message.

On the other hand, as the check result, if it is determined that the control response message is the web service control request message (S1632), the control management unit 132 searches whether the CP to which the corresponding response message is to be transmitted is based on the UPnP or the web service (S1634).

As the search result, if it is determined that the corresponding CP is based on the UPnP, the control message conversion processing unit 133 converts the corresponding web service control response message to a UPnP control response message (S1636).

Then, the control management unit 132 searches URL information of a CP that has transmitted the previous control request message through the device/service information list management unit 153 and then transmits a request message converted to the searched URL (S1630).

Figure 17A:
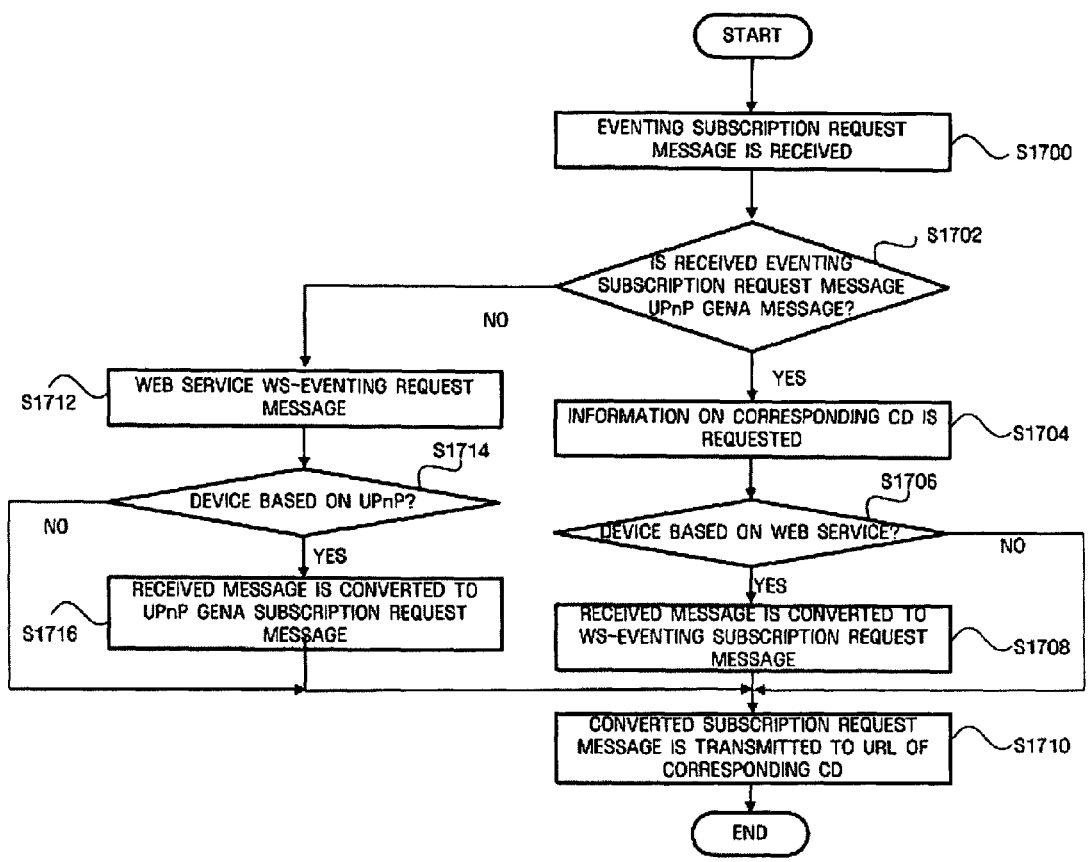
FIGS. 17A to 17C are flowcharts illustrating an eventing operation in the method of supporting the compatibility of devices on a home network according to an exemplary embodiment of the present invention.
Figure 17B:
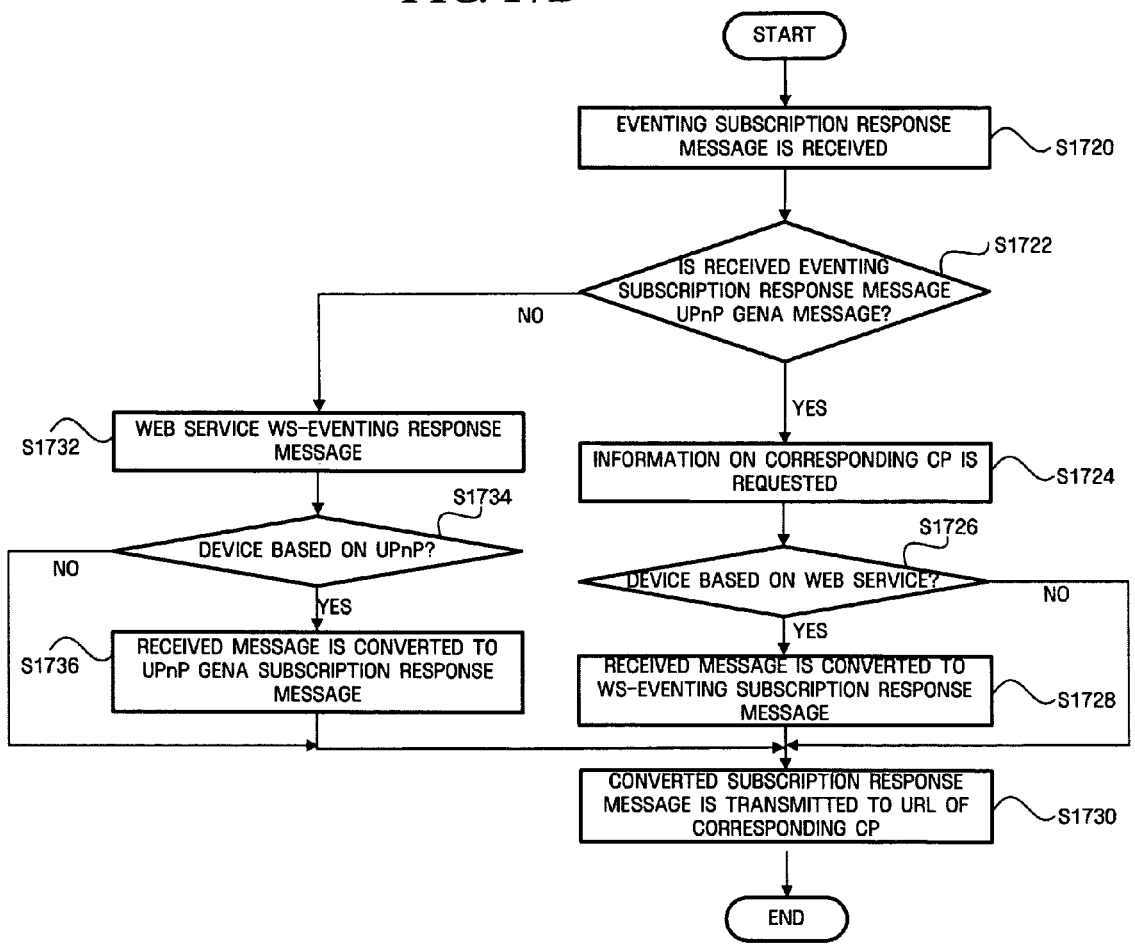
Figure 17C:
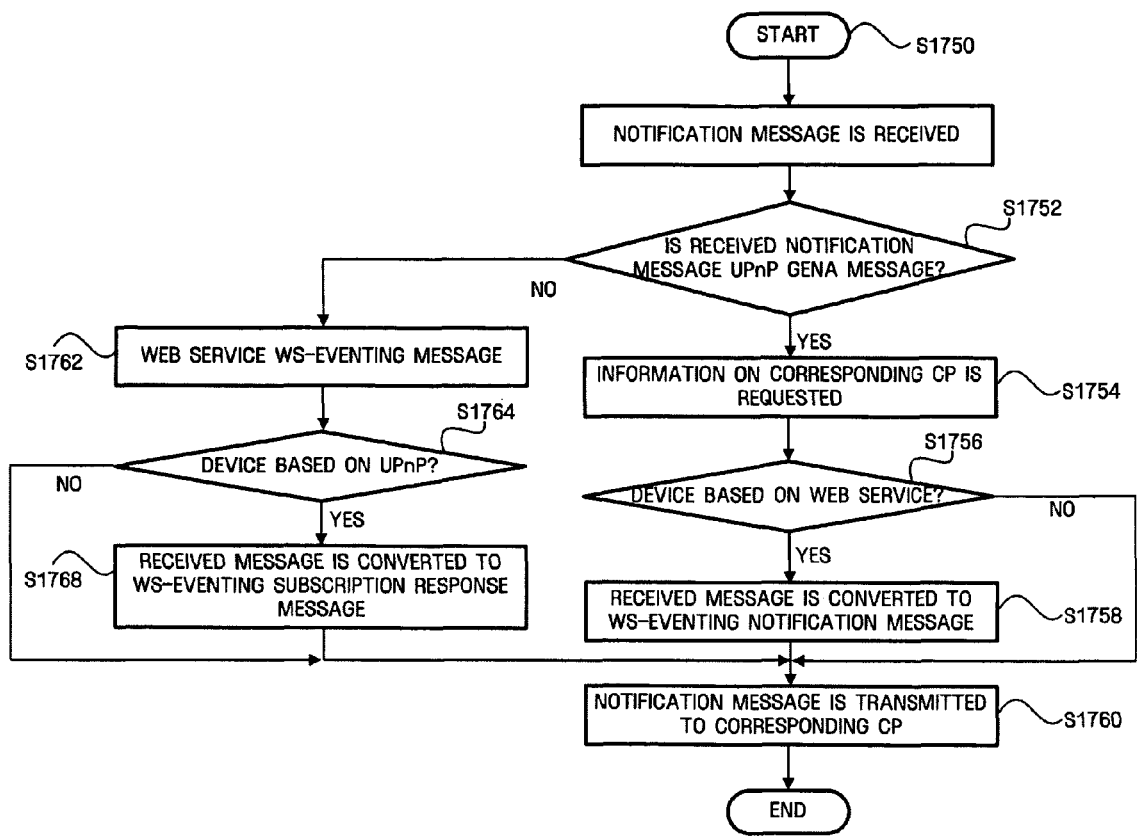

FIGS. 17A to 17C are flowcharts illustrating the eventing operation in the method of supporting the compatibility of devices on a home network according to an exemplary embodiment of the present invention. Here, the eventing operation is divided into a procedure of processing a subscription request message and a procedure of processing a subscription response message.

FIG. 17A is a flowchart illustrating the procedure of processing the subscription request message.

First, the eventing management unit 142 receives an event subscription request message transmitted from a CP existing on the home network (S1700) and then checks whether the received event subscription request message is a GENA message or a WS-eventing message.

As a result of the check of the eventing management unit 142, if it is determined that the received event subscription request message is a UPnP GENA message (S1702), the eventing message conversion processing unit 143 requests the device/service information list management unit 153 of information on the corresponding CD (S1704) and checks whether the corresponding CD is based on the UPnP or the web service on the basis of the information on the CD transmitted in response to the request.

As a result of the check, if it is determined that the corresponding CD is based on the web service (S1706), the eventing message conversion processing unit 143 converts the corresponding UPnP GENA subscription request message to a WS-eventing subscription request message (S1708).

Then, the eventing management unit 142 searches URL information of the corresponding CD, to which subscription request has been transmitted, through the device/service information list management unit 153 and then transmits a converted subscription request message to the searched URL (S1710).

As the check result, if it is determined that the received event subscription request message is a web service WS-eventing message (S1712), the eventing message conversion processing unit 143 requests the device/service information list management unit 153 of information on the corresponding CD and then checks whether the corresponding CD is based on the UPnP or the web service on the basis of the information on the CD transmitted in response to the request.

As the check result, if it is determined that the corresponding CD is based on the UPnP (S1714), the eventing message conversion processing unit 143 converts the corresponding WS-eventing subscription request message to the UPnP GENA subscription request message (S1716).

Then, the eventing management unit 142 searches URL information of the corresponding CD, to which the subscription request has been transmitted, through the device/service information list management unit 153 and then transmits a converted subscription request message to the corresponding URL (S1710).

FIG. 17B is a flowchart illustrating the procedure of processing the subscription response message.

First, after performing an operation of processing the subscription request message, the eventing management unit 142 receives a response message with respect to the subscription request message transmitted to a CD (S1720). Then, the eventing management unit 142 checks whether the corresponding event subscription response message is the GENA message or the WS-eventing message.

As the check result, if it is determined that the transmitted response message is the UPnP GENA message (S1722), the eventing message conversion processing unit 143 requests the device/service information list management unit 153 of information on the CP to which the response message is to be transmitted (S1724) and then checks whether the corresponding CP is based on the UPnP or the web service on the basis of the information on the CP transmitted in response to the request.

As the search result, if it is determined that the corresponding CP is based on the web service (S1726), the eventing message conversion processing unit 143 converts the corresponding UPnP GENA subscription request message to the WS-eventing subscription request message (S1728).

Then, the eventing management unit 142 searches URL information of a CP that has transmitted the previous subscription request message through the device/service information list management unit 153 and then transmits a response message converted to the searched URL (S1730). Here, the URL information of the CP that has transmitted the subscription request message should be added in a subscription list included in corresponding device/service information on the basis of the subscription response message. Then, when a notification message is transmitted from the CD, the corresponding notification message is transmitted to the CP registered in the corresponding subscription list. Next, a procedure of processing the notification message will be described with reference to FIG. 17C.

As the check result, if it is determined that the transmitted response message is the web service WS-eventing message (S1732), the eventing message conversion processing unit 143 requests the device/service information list management unit 153 of information on the corresponding CP and then checks whether the corresponding CP is based on the UPnP or the web service on the basis of the information on the CP transmitted in response to the request.

As the check result, if it is determined that the corresponding CP is based on the UPnP (S1734), the eventing message conversion processing unit 143 converts the corresponding WS-eventing subscription request message to the UPnP GENA subscription request message (S1736).

Then, the eventing management unit 142 searches URL information of a CP that has transmitted the previous subscription request message through the device/service information list management unit 153 and then transmits a response message converted to the searched URL (S1730).

FIG. 17C is a flowchart illustrating the procedure of processing the notification message.

First, the eventing management unit 142 receives a notification message from a CD existing on the home network (S1750). Then, the eventing management unit 142 checks whether the corresponding notification message is the GENA message or the WS-eventing message.

As the check result, if it is determined that the transmitted notification message is the UPnP GENA message (S1752), the eventing message conversion processing unit 143 requests the device/service information list management unit 153 of information on the CP to which the notification message is to be transmitted (S1754) and then checks whether the corresponding CP is based on the UPnP or the web service on the basis of the requested information.

As the check result, if it is determined that the corresponding CP is based on the web service (S1756), the eventing message conversion processing unit 143 converts the UPnP GENA notification message, which has been transmitted from the CD, to a WS-eventing notification message (S1758).

Then, the eventing management unit 142 searches corresponding device/service information through the device/service information list management unit 153 and then transmits the notification message to a CP registered in the subscription list included in searched information (S1760).

As the check result, if it is determined that the transmitted notification message is the web service WS-eventing message (S1762), the eventing message conversion processing unit 143 checks whether the CP, to which the notification message has been transmitted, is based on the UPnP or the web service.

As the check result, if it is determined that the CP is based on the UPnP (S1764), the eventing message conversion processing unit 143 converts the WS-eventing notification message, which has been transmitted from the CD, to the UPnP GENA notification message (S1768).

Then, the eventing management unit 142 searches the corresponding device/service information through the device/service information list management unit 153 and then transmits the notification message to the CP registered in the subscription list included in searched information (S1756).

As described above, according to the middleware device and method of supporting the compatibility of devices on a home network according to exemplary embodiments of the present invention, one or more following effects can be obtained.

That is, it is possible to make all kinds of devices based on UPnP and web service compatible with each other by means of a middleware device that can convert protocols of UPnP and web service existing on a home network.

Further, since the protocols of the UPnP and the web service are converted and then transmitted to devices existing on the home network, it is possible to use existing devices based on the UPnP and web service.

Although the present invention has been described in connection with the exemplary embodiments thereof, it will be apparent to those skilled in the art that various modifications and changes may be made thereto without departing from the scope and spirit of the invention. Therefore, it should be understood that the above exemplary embodiments are not limiting, but illustrative in all aspects.

What is claimed is:

1. A middleware device for supporting compatibility of devices on a home network, the middleware device comprising:
    a computer processor comprising:
    a discovery unit which receives a discovery message based on a protocol among different protocols utilized by different devices existing on the home network, wherein the different protocols include a Universal Plug-and-Play (UPnP) protocol and a web service protocol;
    a description unit which creates a description file of a predetermined device which is requested by a control point using a request message based on one of the different protocols and converts the description file which is created such that the description file can be processed by the control point which requested the description file; and
    an information management unit which manages service information and information on devices existing on the home network based on the discovery message and the description file,
    wherein the discovery unit determines whether the protocol of the discovery message is the UPnP protocol or the web service protocol and acquires description information of the discovery message corresponding to the determined protocol, and
    wherein the information management unit checks whether a controlled device corresponding to the received discovery message is registered in the information management unit based on the received discovery message, and if it is determined that the controlled device is not registered in the information management unit, the information management unit creates device and service information of the controlled device directly from the description information of the discovery message, and stores the created device and service information of the controlled device in the information management unit, and if it is determined that the controlled device is registered in the information management unit, the discovery unit converts the received discovery message to a message based on a protocol that can be processed by the control point to which the discovery message is to be transmitted in the case when the received discovery message is received from the controlled device, and unicasts a response message with respect to the received discovery message to the control point, based on a protocol that can be processed by the control point in the case when the received discovery message is received from the control point.

2. The middleware device of claim 1, wherein the discovery unit converts the discovery message to the web service protocol if the discovery message is based on the UPnP protocol and the discovery message is to be transmitted to a device which is capable of processing discovery messages based on the web service protocol,
    wherein the discovery message is converted to the UPnP protocol if the discovery message is based on the web service protocol and the discovery message is to be transmitted to a device which is capable of processing discovery messages based on the UPnP protocol.

3. The middleware device of claim 1, wherein the description unit creates the description file of the predetermined device in the web service protocol if the control point which requested the description file is not capable of processing the description files based on the UPnP protocol,
    wherein the description unit creates the description file of the predetermined device in the UPnP protocol if the control point which requested the description file is not capable of processing the description files based on the web service protocol.

4. The middleware device of claim 1, wherein the discovery unit comprises:
    a discovery management unit which classifies the protocol of the discovery message transmitted according to the UPnP protocol and the web service protocol and stores the transmitted discovery message in the information management unit; and
    a discovery message conversion processing unit which converts the transmitted discovery message such that the discovery message is converted from the UPnP protocol if the discovery message is transmitted to a device which is capable of processing discovery messages based on the web service protocol and the discovery message is converted from the web service protocol if the discovery message is transmitted to a device which is capable of processing discovery messages based on the UPnP protocol.

5. The middleware device of claim 1, wherein the description unit comprises:
    a description management unit which creates the description file of the predetermined device which is requested using the request message and stores the created description file in the information management unit; and
    a description file conversion processing unit which converts the description file which is created in accordance with one of the UPnP protocol and the web service protocol which is utilized by the control point that requested the description.

6. The middleware device of claim 1, wherein the information management unit comprises:
    a device and service information list which stores the service information and the information on the devices existing on the home network that have been transmitted from the discovery unit and the description unit; and
    a device and service information list management unit which manages the device and service information list and updates information of the device and service information list and the discovery unit.

7. The middleware device of claim 1, further comprising a control unit which receives a control message based on one of the UPnP and web service protocols and converts the control message to a message based on the other of the UPnP protocol and the web service protocol that can be processed by a device to which the control message is to be transmitted.

8. The middleware device of claim 1, further comprising an eventing unit which receives an eventing message based on one of the UPnP and web service protocols and converts the eventing message to a message based the other of the UPnP protocol and the web service protocol that can be processed by a device to which the eventing message is to be transmitted.

9. A method of supporting compatibility of devices on a home network, the method comprising:
  receiving, from a controlled device, a first discovery message including CD information of the controlled device, based on a protocol among a plurality of different protocols utilized by different devices existing on the home network, wherein the plurality of different protocols include a Universal Plug-and-Play (UPnP) protocol and a web service protocol;
  determining whether the protocol of the first discovery message is the UPnP protocol or the web service protocol and acquiring description information of the first discovery message corresponding to the determined protocol;
  checking whether the controlled device corresponding to the CD information in the first discovery message is registered in a middleware device using the CD information in the first discovery message;
  if it is determined that the controlled device is not registered in the middleware device by checking, creating device and service information of the controlled device directly from the description information of the discovery message received from the controlled device, and storing the created device and service information of the controlled device;
  if it is determined that the controlled device is registered in the middleware device by the checking, converting the first discovery message to a message based on a protocol that can be processed by the control point to which the first discovery message is to be transmitted, and multicasting the converted first discovery message on the home network;
  receiving, from the control point, a second discovery message including the CD information, based on a protocol among a plurality of different protocols utilized by different devices existing on the home network,
  determining the protocol of the second discovery message;
  unicasting a response message using the discovery information registered in the middleware device on the corresponding controlled device corresponding to the CD information included in the second discovery message, to the control point.

10. The method of claim 9, wherein the first discovery message is converted to the web service protocol if the first discovery message is based on the UPnP protocol and the first discovery message is to be transmitted to a device which is capable of processing discovery messages based on the web service protocol,
  wherein the first discovery message is converted to the UPnP-protocol if the first discovery message is based on the web service protocol and the first discovery message is to be transmitted to a device which is capable of processing discovery messages in the UPnP protocol.

11. The method of claim 9, wherein the devices existing on the home network include a UPnP control point (CP) which transmits second discovery messages based on the UPnP protocol and a web service CP which transmits second discovery messages based on the web service protocol.

12. The method of claim 9, wherein the second discovery message includes a Search or Probe message.

13. A method of supporting compatibility of devices on a home network including a middleware device, the method comprising:
  receiving by the middleware device, from a control point, a description request message which is based on a protocol among a plurality of different protocols utilized by different devices existing on the home network, the description request message requesting description on device and service of a controlled device, wherein the plurality of different protocols include a Universal Plug-and-Play (UPnP) protocol and a web service protocol;
  determining by the middleware device, whether the protocol of the description request message is the UPnP protocol or the web service protocol;
  searching by the middleware device, information on the controlled device corresponding to the determined protocol of the description request message received from the control point;
  converting by the middleware device, a description message of the controlled device to a message based on a protocol that can be processed by the control point if it is determined on the basis of a result of the searching that the controlled device supports a protocol different from the protocol of the description request message; and
  transmitting by the middleware device, the converted description message to the control point.

14. The method of claim 13, wherein the description message of the controlled device is converted to the web service protocol if the description request message is based on the UPnP protocol and the controlled device supports the web service protocol, and the description message of the controlled device is converted to the UPnP protocol if the description request message is based on the web service protocol and the controlled device supports the UPnP protocol.

15. The method of claim 13, wherein the devices existing on the home network include a UPnP control point (CP) which transmits description request messages based on the UPnP protocol and a web service CP which transmits description request messages according to the web service protocol.

16. The method of claim 15, wherein if a control message is transmitted from the UPnP CP or the web service CP existing on the home network,
  determining whether the transmitted control message is based on the UPnP protocol or the web service protocol;
  searching information on a predetermined control device (CD) to which the control message is to be transmitted; and
  converting the transmitted control message to a control message based on the web service protocol if the transmitted control message is determined to be based on the UPnP protocol as a result of the determining and the CD is determined to be based on the web service protocol as a result of the searching.

17. The method of claim 15, wherein if an eventing message is transmitted from the UPnP CP or the web service CP existing on the home network,
  determining whether the transmitted eventing message is based on the UPnP protocol or the web service protocol;
  searching information on a predetermined control device (CD) to which the eventing message is transmitted; and
  converting the transmitted eventing message to an eventing message based on the web service protocol if the transmitted eventing message is determined to be based on the UPnP protocol as a result of the determining and the CD is determined to be based on the web service protocol as a result of the searching.

18. A middleware device for supporting compatibility of devices on a home network, the middleware device comprising:
  a computer processor comprising:
    a discovery unit which receives, from a first device among different devices existing on the home network, a discovery message based on a protocol among different protocols utilized by the different devices, wherein the different protocols include a Universal Plug-and-Play (UPnP) protocol and a web service protocol;

a description unit which creates a description file of a predetermined device which is requested using a request message based on one of the different protocols and converts the description file which is created such that the description file can be processed by a device which requested the description file; and an information management unit which manages service information and information on devices existing on the home network based on the discovery message and the description file, wherein the discovery unit determines whether the protocol of the discovery message is the UPnP protocol or the web service protocol and acquires description information of the discovery message corresponding to the determined protocol, wherein the information management unit checks whether the first device is registered in the information management unit, and the discovery unit converts the discovery message to a message based on a protocol that can be processed by a second device to which the discovery message is to be transmitted and multicasts the converted message if it is determined that the first device is registered in the information management unit, and wherein the information management unit creates information on the first device directly from the description information of the discovery message received from the first device, and stores the created information, the information being independent from the different protocols, if it is determined that the first device is not registered in the information management unit.

19. A method of supporting compatibility of devices on a home network including a middleware device, the method comprising:

receiving by the middleware device, from a first device, a discovery message based on a protocol among a plurality of different protocols utilized by different devices existing on the home network, wherein plurality of different protocols include a Universal Plug-and-Play (UPnP) protocol and a web service protocol;

determining by the middleware device, whether the protocol of the discovery message is the UPnP protocol or the web service protocol and acquiring description information of the discovery message;

checking by the middleware device, whether the first device is registered in the middleware device; converting by the middleware device, the discovery message to a message based on a protocol that can be processed by a second device to which the discovery message is to be transmitted and multicasting the converted message if it is determined that the first device is registered in the middleware device; and creating by the middleware device, information on the first device directly from the description information of the received discovery message, and storing the created information, the information being independent from the different protocols, if it is determined that the first device is not registered in the middleware device.

* * * * *